(12) United States Patent
Van Buskirk et al.

(10) Patent No.: US 8,534,373 B2
(45) Date of Patent: Sep. 17, 2013

(54) SOIL TILLING AND PLANTING IMPLEMENT

(75) Inventors: Loyd C. Van Buskirk, Brownsdale, MN (US); Brian R. Meldahl, Brownsdale, MN (US); Dylan C. Van Buskirk, Brownsdale, MN (US)

(73) Assignee: L & B Manufacturing, Inc., Brownsdale, MN (US)

(*) Notice: Subject to any disclaimer, the term of this patent is extended or adjusted under 35 U.S.C. 154(b) by 0 days.

(21) Appl. No.: 13/595,762

(22) Filed: Aug. 27, 2012

(65) Prior Publication Data

US 2012/0312568 A1 Dec. 13, 2012

Related U.S. Application Data

(63) Continuation-in-part of application No. 13/441,544, filed on Apr. 6, 2012, which is a continuation-in-part of application No. 13/249,708, filed on Sep. 30, 2011, which is a continuation-in-part of application No. 13/194,524, filed on Jul. 29, 2011, which is a continuation-in-part of application No. 13/158,732, filed on Jun. 13, 2011, which is a continuation-in-part of application No. 12/771,219, filed on Apr. 30, 2010, now Pat. No. 8,430,179.

(60) Provisional application No. 61/214,955, filed on Apr. 30, 2009.

(51) Int. Cl.
| | |
|---|---|
| *A01B 63/32* | (2006.01) |
| *A01B 33/12* | (2006.01) |
| *A01B 35/28* | (2006.01) |
| *A01B 39/08* | (2006.01) |
| *A01B 39/19* | (2006.01) |
| *E02F 3/20* | (2006.01) |
| *A01B 35/16* | (2006.01) |
| *A01B 49/27* | (2006.01) |
| *A01B 49/06* | (2006.01) |

(52) U.S. Cl.
USPC ........... 172/166; 172/554; 172/552; 172/548; 172/151; 172/173; 172/187; 172/198; 172/810; 172/315; 172/321; 172/325; 172/326; 172/453; 172/484; 172/657; 172/661; 172/662; 172/663; 172/684.5; 172/685; 172/748; 172/752; 172/762; 172/763; 172/766; 172/771; 111/139; 111/167; 111/927

(58) Field of Classification Search
USPC ................. 111/118, 140, 170, 139, 149, 157, 111/163, 167, 927; 172/166, 540, 542, 551, 172/554–556, 1, 189, 518, 604, 599, 601, 172/165, 701, 552, 548, 140, 145, 149–151, 172/170, 172, 173, 184, 187, 195, 198, 260.5, 172/239, 261, 263–268, 272–275, 810, 310, 172/315–318, 321, 324–326, 387, 388, 391, 172/394, 395, 407, 413, 423, 424, 452, 468, 172/453, 483–485, 613, 619, 624, 624.5, 172/634–637, 657, 661–663, 668, 675, 677–681, 172/684.5, 685, 705, 711, 714, 734, 736, 172/739, 740, 748, 752, 762, 763, 765, 766, 172/771
See application file for complete search history.

(56) References Cited

U.S. PATENT DOCUMENTS

| | | |
|---|---|---|
| 3,177,828 A | 4/1965 | Cramer |
| 3,314,386 A | 4/1967 | Kopaska |

(Continued)

OTHER PUBLICATIONS

Korean Intellectual Property Office, International Searching Authority, International Search Report, Written Opinion of the International Searc Authority with Notice mailed May 16, 2012 in International Application PCT/US2011/057076, 9 pages.

*Primary Examiner* — Christopher J Novosad
(74) *Attorney, Agent, or Firm* — Nikolai & Mersereau, P.A.; C. G. Mersereau

(57) ABSTRACT

A mount for carrying a plurality of field-conditioning implements selected from trash whipping implements, rolling baskets and coulters for connection to a planter or other multi-row implement is disclosed. A height and force adjustable mounting system is also disclosed that enables the force of such an implement on the soil to be modulated as desired.

10 Claims, 37 Drawing Sheets

(56) References Cited

U.S. PATENT DOCUMENTS

| | | |
|---|---|---|
| 3,523,585 A | 8/1970 | Godbersen |
| 3,528,507 A | 9/1970 | Morkoski |
| 3,554,145 A | 1/1971 | Hornung et al. |
| 4,227,581 A | 10/1980 | Klotzbach |
| 4,422,511 A | 12/1983 | Poggemiller et al. |
| 4,444,130 A | 4/1984 | Ray |
| 4,489,789 A | 12/1984 | Pearce |
| 4,615,396 A | 10/1986 | Arnold |
| 4,624,471 A | 11/1986 | Haines et al. |
| 4,625,809 A | 12/1986 | Moynihan |
| 4,865,132 A | 9/1989 | Moore, Jr. |
| 5,052,495 A | 10/1991 | McFarlane et al. |
| 5,129,282 A | 7/1992 | Bassett et al. |
| 5,479,992 A | 1/1996 | Bassett |
| 5,499,683 A | 3/1996 | Bassett |
| 5,562,054 A | 10/1996 | Ryan |
| 5,797,460 A | 8/1998 | Parker et al. |
| 6,068,061 A | 5/2000 | Smith et al. |
| 6,135,567 A | 10/2000 | Cochran |
| 6,142,085 A | 11/2000 | Drever et al. |
| 6,581,530 B1 | 6/2003 | Hall et al. |
| 6,688,245 B2 | 2/2004 | Juptner |
| 6,701,857 B1 | 3/2004 | Jensen et al. |
| 6,926,093 B1 | 8/2005 | Fink et al. |
| 7,308,859 B2 | 12/2007 | Wendte et al. |
| 7,360,494 B2 | 4/2008 | Martin |
| 7,360,495 B1 | 4/2008 | Martin |
| 7,395,767 B2 | 7/2008 | Sulman |
| 7,426,893 B2 | 9/2008 | Wendte et al. |
| 7,451,712 B2 | 11/2008 | Bassett et al. |
| 7,472,658 B2 | 1/2009 | Ostlie |
| 7,574,969 B1 | 8/2009 | Henry et al. |
| 7,575,066 B2 | 8/2009 | Bauer |
| 7,578,246 B2 | 8/2009 | Ryder et al. |
| 7,594,546 B2 | 9/2009 | Ankenman |
| 7,640,875 B2 | 1/2010 | Forchino |
| 7,673,570 B1 | 3/2010 | Bassett |
| 7,861,660 B2 | 1/2011 | Martin |
| 7,866,410 B2 | 1/2011 | Ryder et al. |
| 7,921,931 B2 | 4/2011 | Henry et al. |
| 7,938,074 B2 | 5/2011 | Liu |
| 7,946,231 B2 | 5/2011 | Martin et al. |
| 7,975,630 B2 | 7/2011 | Bourgault et al. |
| 7,980,186 B2 | 7/2011 | Henry |
| 7,992,650 B2 | 8/2011 | Landoll et al. |
| 7,997,217 B2 | 8/2011 | Stark et al. |
| 8,028,632 B2 | 10/2011 | Ryder et al. |
| 8,028,759 B2 | 10/2011 | Ryder et al. |
| 8,042,620 B2 | 10/2011 | Henry |
| 8,047,147 B2 | 11/2011 | Harnetiaux |
| 8,069,798 B2 | 12/2011 | Martin |
| 8,100,192 B2 | 1/2012 | Henry et al. |
| 8,100,193 B2 | 1/2012 | Henry et al. |
| 8,408,149 B2 | 4/2013 | Rylander |
| 2003/0226670 A1 | 12/2003 | Knobloch et al. |
| 2005/0263050 A1 | 12/2005 | Bassett et al. |
| 2008/0302283 A1 | 12/2008 | Martin |
| 2008/0314301 A1 | 12/2008 | Whalen et al. |
| 2009/0107370 A1 | 4/2009 | Ostlie |
| 2010/0006309 A1 | 1/2010 | Ankenman |
| 2010/0006310 A1 | 1/2010 | Bauer |
| 2010/0275827 A1 | 11/2010 | Van Buskirk et al. |
| 2010/0300710 A1 | 12/2010 | Bassett |
| 2011/0000410 A1 | 1/2011 | Manasseri et al. |
| 2011/0067613 A1 | 3/2011 | Martin |
| 2011/0179983 A1 | 7/2011 | Ryder et al. |
| 2011/0231069 A1 | 9/2011 | Ryder et al. |
| 2011/0232550 A1 | 9/2011 | Van Buskirk et al. |
| 2011/0239920 A1 | 10/2011 | Henry |
| 2011/0247537 A1 | 10/2011 | Freed |
| 2011/0247843 A1 | 10/2011 | Whalen et al. |
| 2011/0284252 A1 | 11/2011 | Friggstad et al. |
| 2011/0303137 A1 | 12/2011 | Tevs et al. |
| 2011/0308826 A1 | 12/2011 | Ryder et al. |
| 2012/0006240 A1 | 1/2012 | Henry |
| 2012/0012042 A1 | 1/2012 | Castagno Manasseri et al. |
| 2012/0012349 A1 | 1/2012 | Van Buskirk et al. |
| 2012/0017813 A1 | 1/2012 | Van Buskirk et al. |
| 2012/0042811 A1 | 2/2012 | Harnetiaux |
| 2012/0042814 A1 | 2/2012 | Harnetiaux |
| 2012/0048159 A1 | 3/2012 | Adams et al. |
| 2012/0048160 A1 | 3/2012 | Adams et al. |
| 2012/0060730 A1 | 3/2012 | Bassett |
| 2012/0060731 A1 | 3/2012 | Bassett |
| 2012/0151910 A1 | 6/2012 | Sauder et al. |

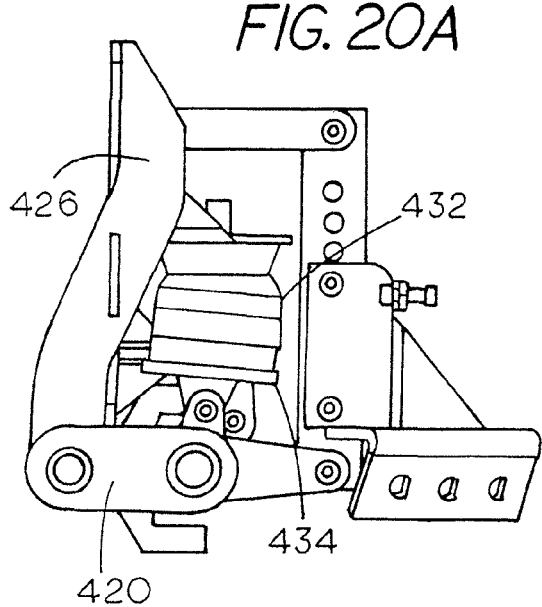
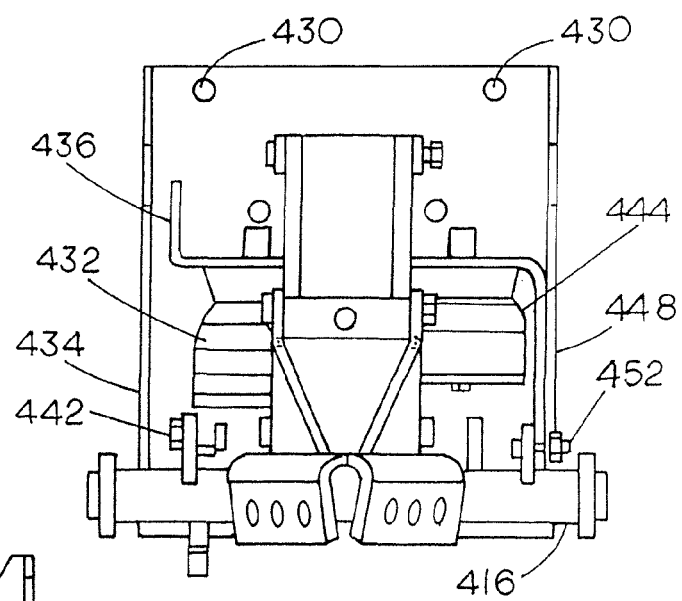
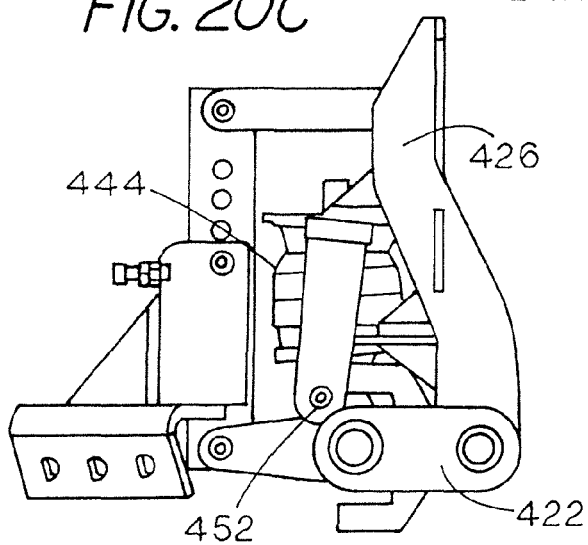

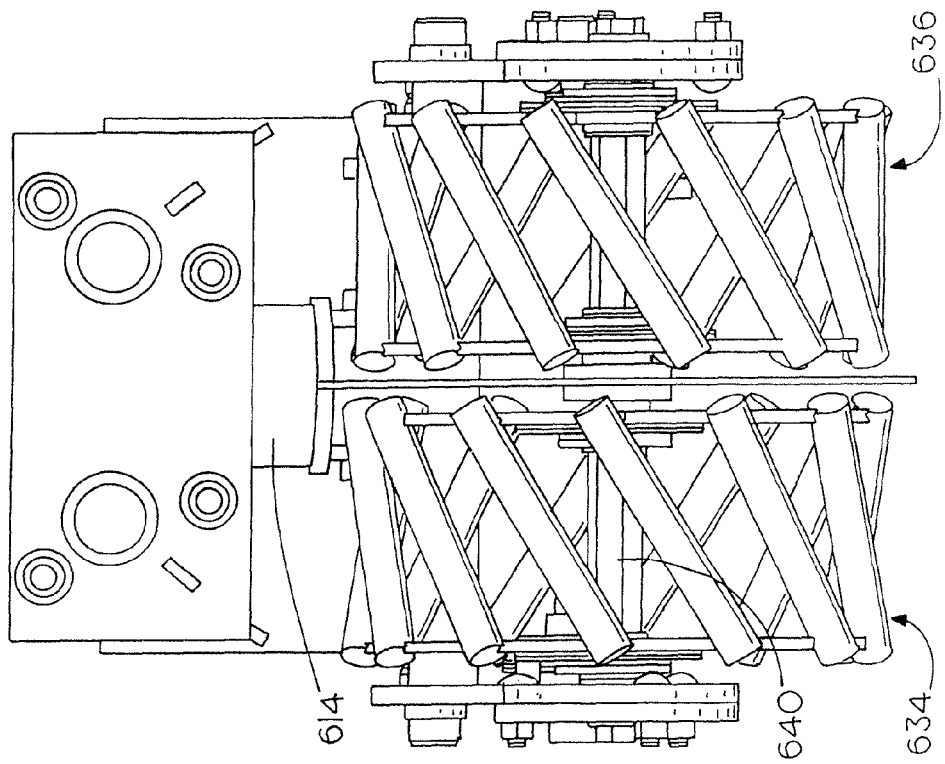
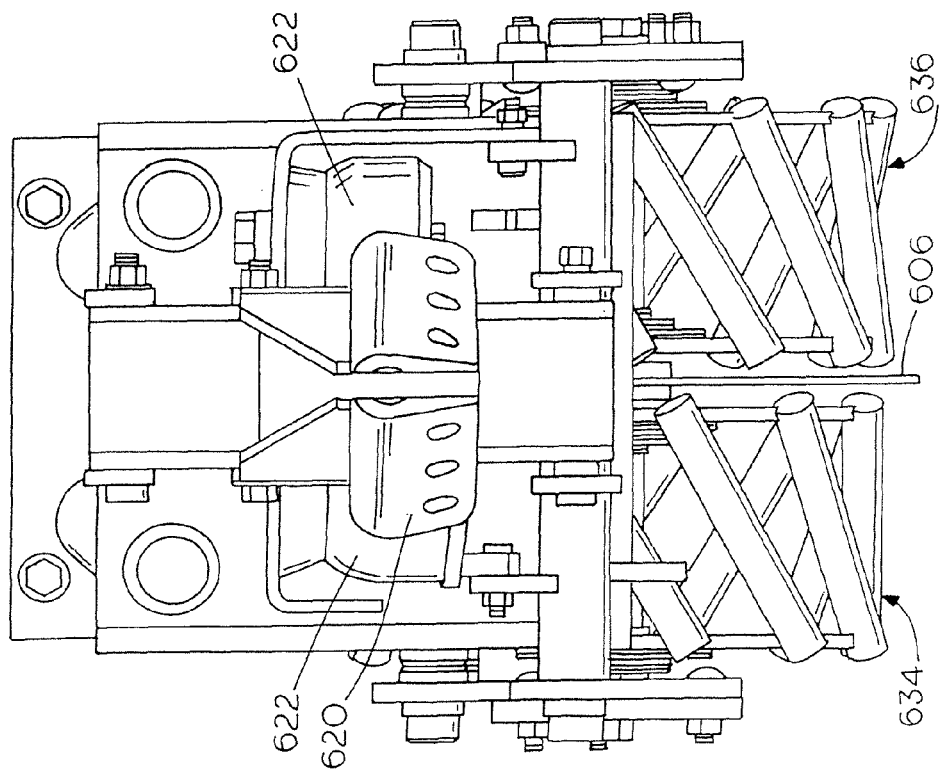

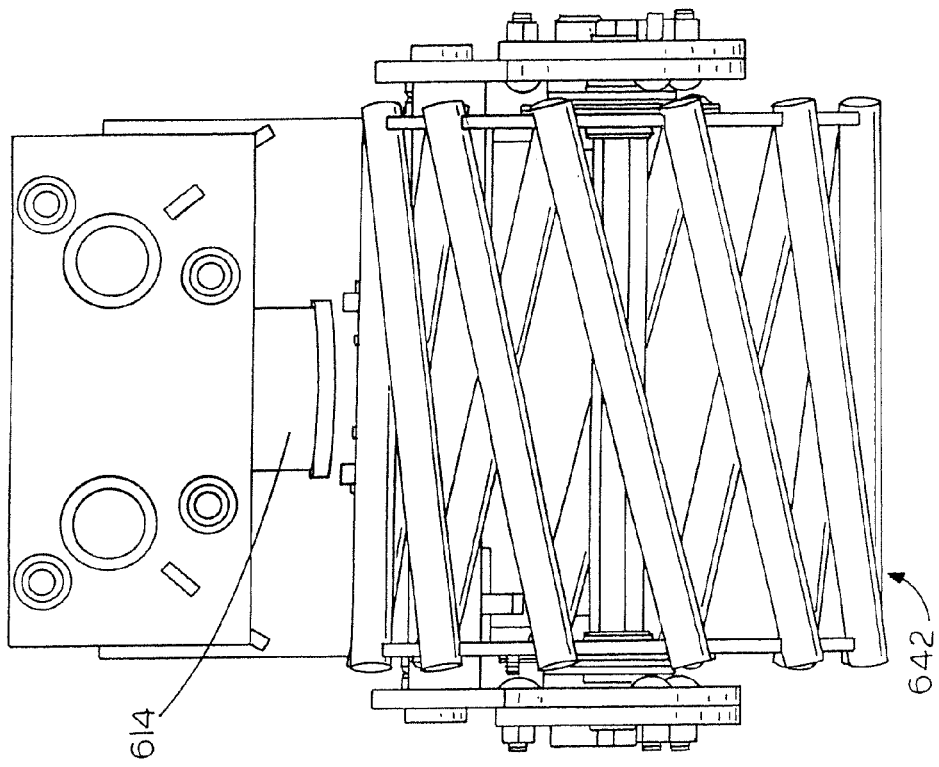
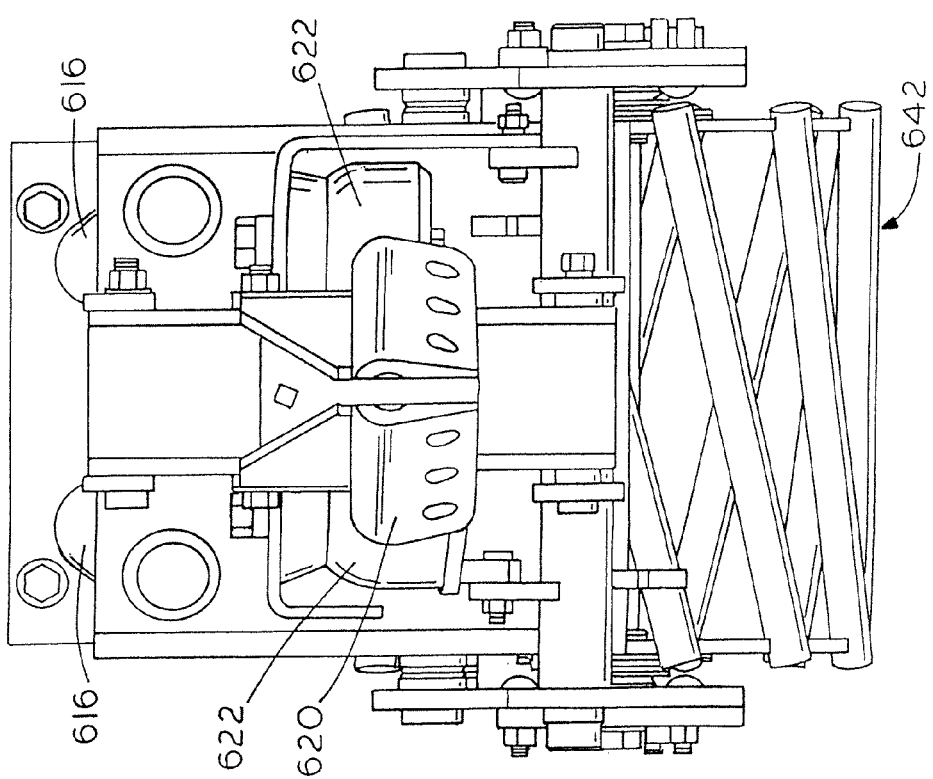

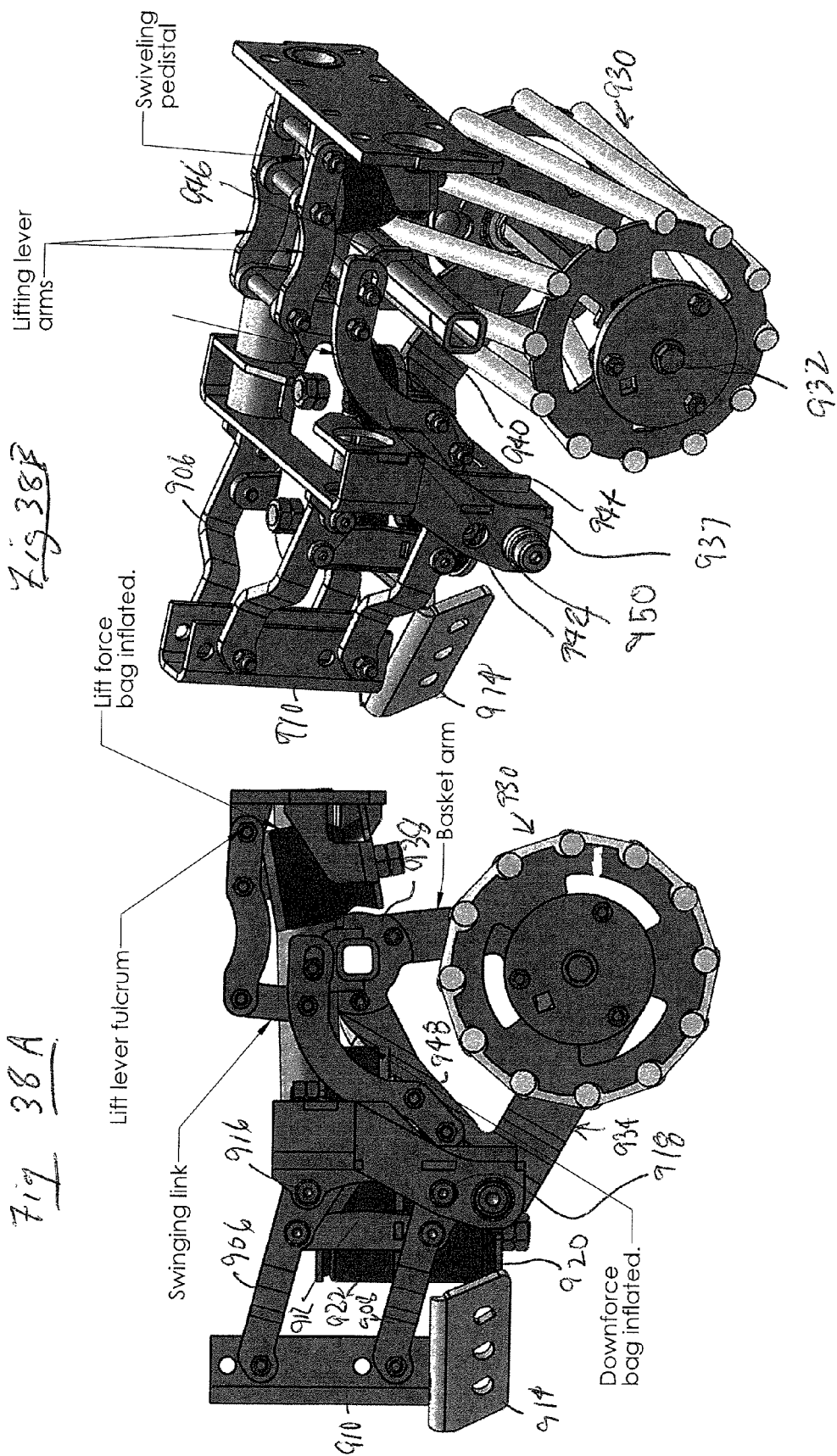

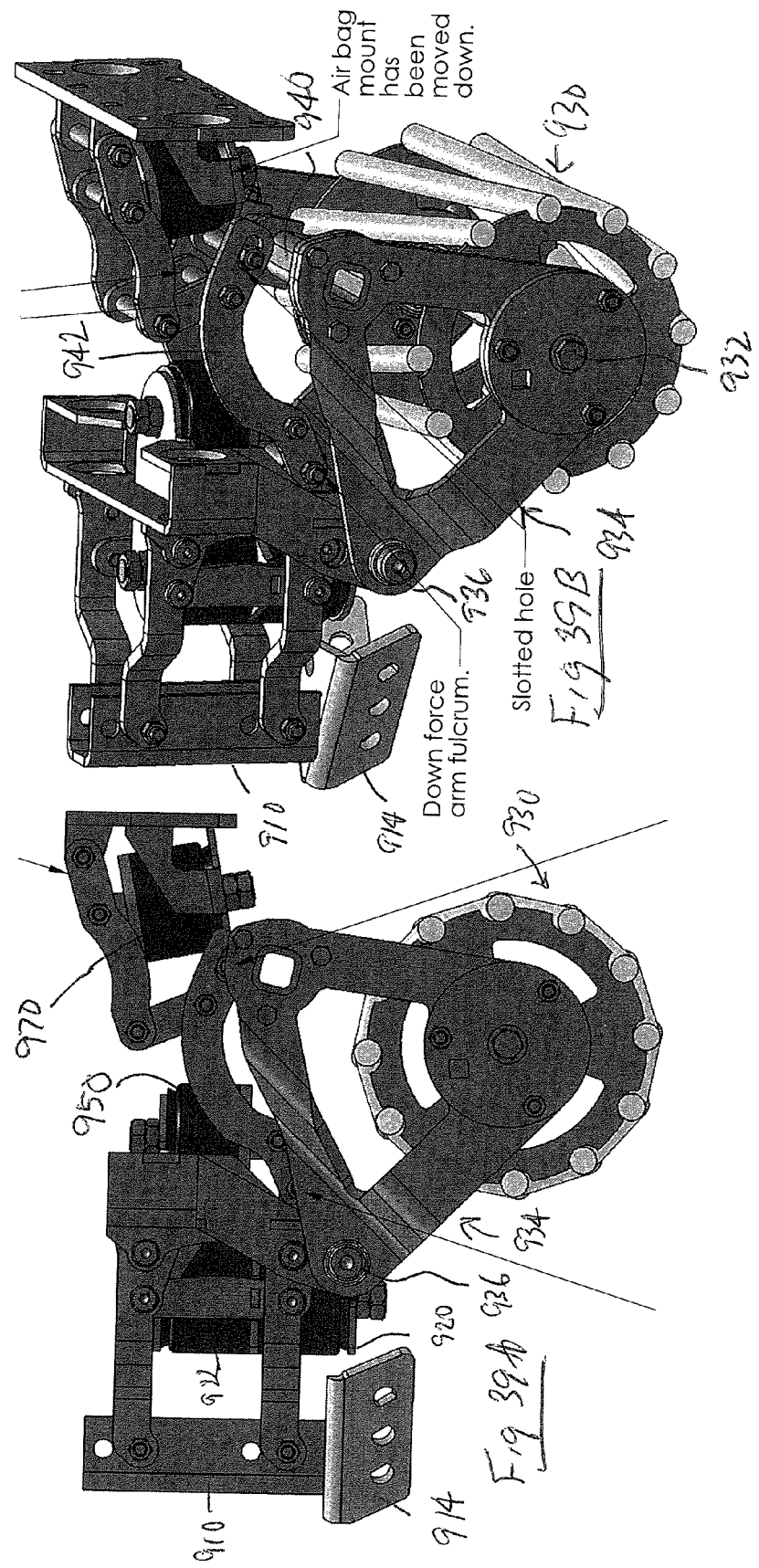

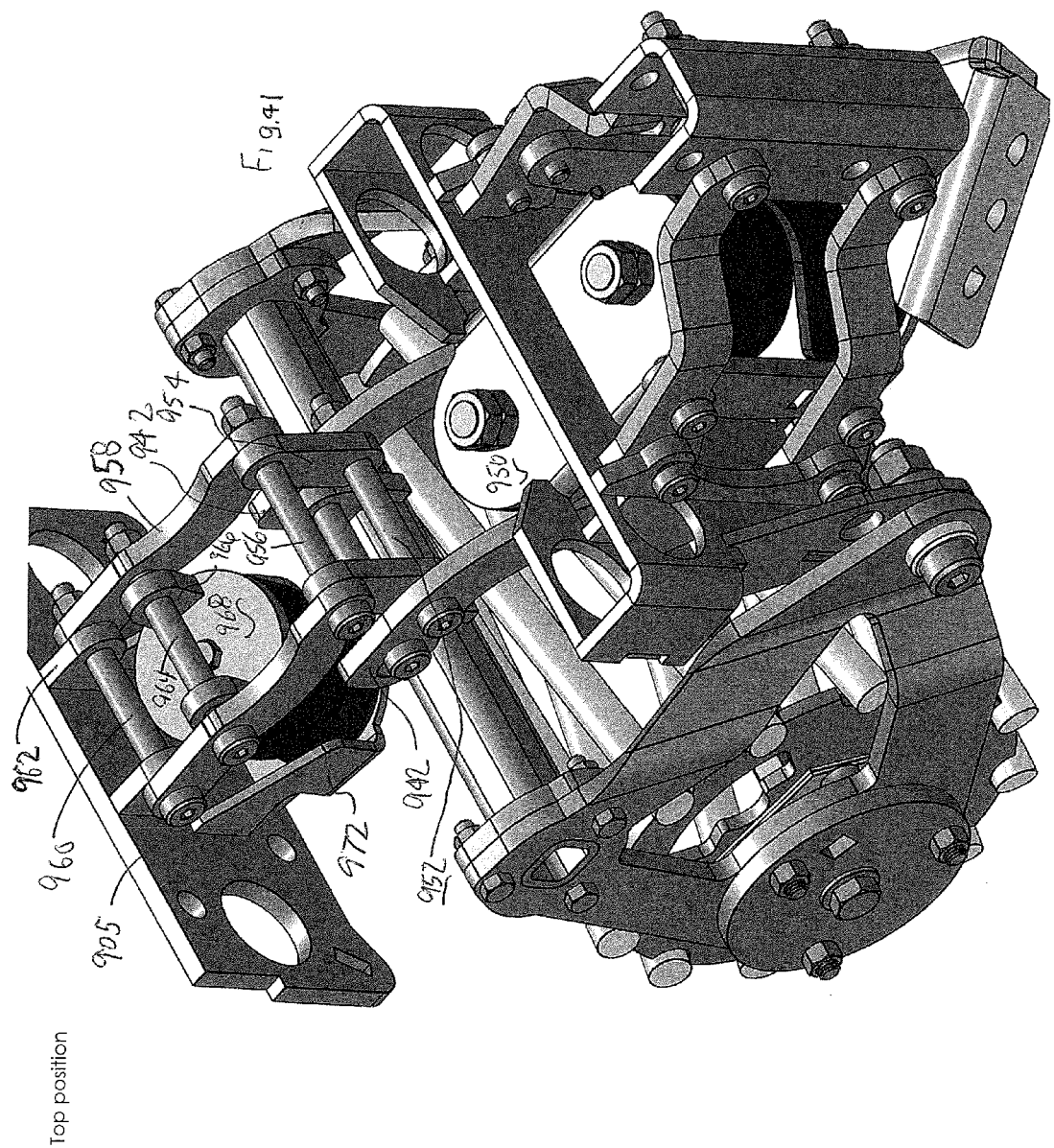

SOIL TILLING AND PLANTING IMPLEMENT

CROSS-REFERENCED TO RELATED APPLICATIONS

This application is a continuation-in-part of application Ser. No. 13/441,544, filed Apr. 6, 2012, which is a continuation-in-part of application Ser. No. 13/249,708, filed Sep. 30, 2011, which is a continuation-in-part of application Ser. No. 13/194,524, filed Jul. 29, 2011, which is a continuation-in-part of application Ser. No. 13/158,732, filed Jun. 13, 2011, which, in turn, is a continuation-in-part of a non-provisional application Ser. No. 12/771,219, filed Apr. 30, 2010 which claims priority to provisional Application No. 61/214,955, filed Apr. 30, 2009, and the present application claims priority from all preceding applications which are also deemed incorporated by reference in their entirety in this application.

STATEMENT REGARDING FEDERALLY SPONSORED RESEARCH OR DEVELOPMENT

Not applicable

BACKGROUND OF THE INVENTION

I. Field of the Invention

This invention is generally directed to the field of agriculture machinery, and more particularly, it relates to a preplanting tillage implements generally used in combination with a seed planting device. Specifically, the invention relates to rolling basket tillage implements, trash moving or trash whipping devices and coulter devices, usually used in tandem with a seed planting implement in which the rolling basket, trash whip and/or coulter devices may be used in various combinations and may have an independent height or deployment adjustment aspect.

II. Related Art

In the spring, prior to planting, farmers must prepare their fields for accepting seed. Many tillage implements have been designed and are used to condition the soil in preparation for planting. Traditional farming includes both primary and secondary tillage tasks to prepare the soil such as plowing, disking, field cultivating and harrowing. Disking is an example of a method of primary tillage and harrowing is an example of a method of secondary tillage.

Primary tillage is a first pass over the soil using a soil conditioning implement attached to the rear of a tractor which works deep into the soil. The soil is usually worked about four inches deep to break up clods of soil, remove air pockets, and destroy weeds deep in the earth. Secondary tillage involves another pass over the same soil, at a more shallow depth, using implements which are generally attached to the rear of the primary tillage unit such that the secondary tillage unit follows the primary tillage unit. The secondary tillage unit generally works the soil to a depth of about two inches.

The secondary tillage unit is usually a final conditioning tool to prepare the soil for planting. Various units may chop up crop residues, or move them out of the way of rows to be planted, break up soil clods and break up any crust on the top of the soil, provide seed furrows, weed control, incorporate chemicals into the soil, and stir and firm the soil closer to the surface.

Rolling basket seedbed finishers represent an important type of secondary soil conditioning implement. Rolling baskets are primarily used as soil leveling devices to break up and minimize clods of soil and to remove air pockets from the soil. Farmers obtain great benefit from using rolling baskets as a means of secondary tillage to provide a level soil for planting. The ability to break up clods of soil, remove air pockets and further incorporate chemicals generally leads to better crop yields at harvest.

In addition to rolling basket seedbed finishers, other agriculture implements are also generally used in preparing the soil for planting. These include a trash whipping-type device which includes a pair of spiked disks normally mounted on a triangular mount which are used to move debris out of the way prior to soil conditioning. Other soil conditioning tools which might be mounted before seed planting implements include coulter devices which employ a sharp steel wedge that cuts vertically and provides a shallow furrow through the soil.

Accordingly, it would be beneficial if a secondary tillage operation using a rolling basket could advantageously be combined with a planting operation such that one could take immediate advantage of soil in condition for planting by accomplishing the planting project during the same pass over a field. Thus, the attachment of rolling basket tillage for use in conjunction with a seed planting implement would be desirable.

However, the use and effectiveness of rolling baskets or other soil conditioning implements is greatly limited by the condition of the soil. If the soil is too wet, rolling basket soil conditioning implements may become filled and clogged with soil which make them useless for further soil conditioning until they are again emptied of soil. When a farmer realizes that areas of soil in a field are too wet to use such implements, he will generally forego the use of such soil conditioning implements entirely for the season. This means that much of the soil may not be properly treated and an expensive farming implement will lay idle. This is not a desirable or economically efficient situation for farmers.

It would, therefore, also be beneficial to provide an arrangement or mechanism that enables intermittent use of a soil conditioning implement, particularly a rolling basket seedbed finisher, and a planter in a field where areas of soil are dry enough for use, but where there are also areas which are too wet for use. Such a device would allow a farmer to raise rolling basket seedbed finishers above the soil and out of use whenever they reach a section of a field where the soil is too wet and thereafter enable the rolling basket finisher to be lowered and reconnect with the soil in areas where the soil is suitable for use.

Row cleaning devices also known as residue managers, trash moving or trash whipping devices represent another tool which can be advantageously added to a row crop planter to handle amounts of crop or other residue often present on a field to be replanted, particularly if no till farming is being employed. Minimal till or no till farming leaves an amount of crop residue and other debris on a field which may interfere with subsequent seeding operations and so needs to be moved aside from planted rows. The trash whips normally include pairs of angled disks with radially directed teeth or spikes which move crop residue out of the way in advance of planting. The trash whips are normally mounted so that the angled disks form a V-shape and they may or may not overlap.

One problem associated with the operation of trash whippers is controlling the depth of operation of the disk spikes in the field. Some of the present trash whipping devices are mounted at a fixed vertical distance from a tool bar on a planter. The height is adjustable between a series of fixed vertical location settings only. There is no independent control over the force exerted by the implement. Some other current trash whipping devices use air cylinders to modulate resistance in one direction.

Thus, if the lift force or down pressure force on the trash whipping device could be controlled and adjusted, as needed, it would present a distinct advantage.

SUMMARY OF THE INVENTION

The present concept is related to combining soil conditioning implements in the form of rolling basket seedbed finishers with planters to accomplish multiple tasks in a single pass. An aspect of the present concept relates to mounting rolling basket seed finishers on planting equipment. A further aspect of the present concept is related to a mounting assembly for a soil conditioning implement in the form of a rolling basket seedbed finisher. One mounting assembly is for individual rolling baskets which are a part of a plurality of such soil conditioning implements generally arranged in a spaced aligned manner on a multi-row planter, seed drill or other implement, which is used to distribute seeds into the soil, hitched to and pulled by a tractor or other prime mover.

Certain embodiments of the mounting assembly include a height adjustable mounting arrangement for each of the rolling basket soil conditioning implements. Each height adjusting mechanism includes an actuator for adjusting the relative height of a corresponding rolling basket individually, and an associated control system for operating the height adjusting mechanism. The actuator may include a hydraulic or pneumatic cylinder, which may be single or double acting. It is also an aspect of the present invention for the mounting assemblies and associated implements to be combined with a planter and arranged such that rolling basket soil conditioning takes place in front of each individual seed planting unit on a planter.

In a preferred embodiment, each mounting assembly for each rolling basket soil conditioning implement may be controlled from a central control system that includes control switches or a control pad, or the like, having a control device associated with each rolling basket located in the cab of an associated tractor. In this manner, a user is able to adjust the height of each mounting assembly individually and therefore the height of each associated soil conditioning rolling basket implement may be adjusted individually as needed.

It will be appreciated by those skilled in the art that a plurality of actuator devices such as pneumatic or hydraulic cylinders, or the like, together with the necessary controls can be connected to be operated from the cab of a tractor or other farm implement device prime mover by conventional means in a well known manner.

In other embodiments, the rolling basket devices may be fixed to the planter and other mechanical devices may be used to apply varying degrees of force to the soil being processed. These include compression or torsion springs, inflatable airbags, shock absorber devices which may be spring loaded, or the like.

Airbag systems may be single or double acting and an embodiment is shown with dual airbags. Single and dual airbag systems are also shown in embodiments in which trash whipping devices and/or coulter devices are attached to the planter.

With regard to the various agriculture implements that are associated with seed planters, it will be appreciated that various combinations of implements can be mounted to a planter and this may be accomplished in a number of ways. Thus, trash whipping devices may be mounted together with coulter devices on the same mounting structure or on separate spaced mounting structures. A coulter and rolling basket combination may be used in which the rolling basket device is split into side-by-side sections and the coulter device is mounted between the rolling basket sections. This provides a combination implement that can also be mounted with a trash whipping device. A whipping implement can be mounted with a unitary rolling basket or coulter device.

Whether the soil conditioning implements are mounted singly or in combination, the deployment of each can be controlled using different systems. One deployment system features employing an adjustable down force only airbag or other device, when released, allows the implement to float or coast along the top of the soil. In other systems, both adjustable down force and up force or lift devices, which may be pneumatic devices such as airbags, are employed in various configurations and using a variety of mechanical linkages. These include a variety of in-line arrangements which may be generally horizontally or vertically disposed. As used herein the term "air bag" is defined to include any expanding inflatable actuating device and which may be single or double acting; single or multiple convoluted structures are also included. The lift devices generally raise the implement above the level of the soil.

BRIEF DESCRIPTION OF THE DRAWINGS

The foregoing features and advantages of the invention will become apparent to those skilled in the art from the following detailed description of one or more preferred embodiments, especially when considered in conjunction with the accompanying drawings in which:

FIGS. 20A, 20B and 20C are, respectively, left side elevation, front elevation and right side elevation views of adjustable mounts for trash whipping disks shown without disks attached for clarity;

FIGS. 27A and 27B depict front and rear elevational views, respectively, of the embodiment of FIG. 26;

FIGS. 29A and 29B depict front and rear elevational views, respectively, of the arrangement of FIG. 28 with the trash whipping disks removed for clarity;

FIGS. 38A and 38B are views similar to FIGS. 37A and 37B showing both devices in the fully raised or stowed position;

FIGS. 39A and 39B are views similar to 37A and 37B showing both devices in an intermediate position with different parts removed for clarity;

FIG. 41 is a greatly enlarged front perspective view of the embodiment.

DETAILED DESCRIPTION

Figure 1:
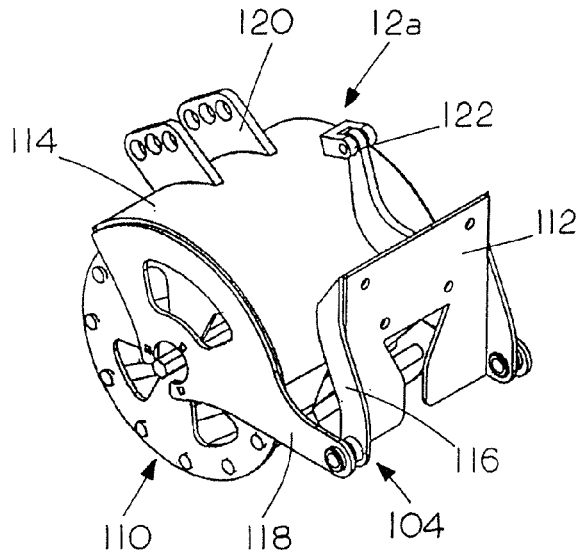
FIG. 1 shows a perspective view of a mounting assembly using a shell-type assembly to attach to a rolling basket.

This description of the preferred embodiments is intended to illustrate representative examples of inventive concepts and is not intended to be limiting as to the scope of the concepts. The examples are to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

An aspect of the invention is directed to an adjustable mounting bracket assembly for attaching a soil conditioning implement in the form of a rolling basket device, particularly to the frame of a planter.

As shown in the embodiment of FIGS. 3-8, the mounting assembly 2, for a rolling basket soil conditioner 10 comprises at least three parts, a height adjustable mounting 4, a height adjusting mechanism or actuator, which may be in the form of a hydraulic (6A in FIG. 9E) or pneumatic cylinder 6, and an associated control system (FIG. 10) for operating a plurality of such height adjusting mechanisms to adjust the height of a plurality of spaced associated connected rolling baskets as normally used in tandem with a planter as towed by a tractor.

Figure 3:
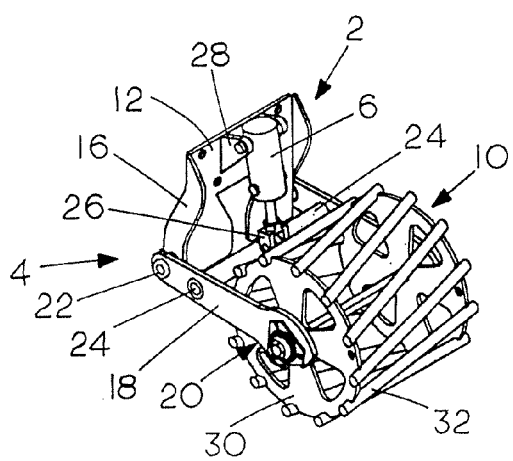
FIG. 3 shows a perspective view of an alternative mounting assembly attaching a rolling basket.

As illustrated in FIG. 3, the height adjustable mounting 4 is composed of several parts including an attachment plate 12 and a pair of spaced parallel side plate members 16 and attachment arms 18 for coupling the rolling basket soil conditioning implement to the attachment plate 12. The attachment plate 12 is adapted to be fixed to the frame of a farming implement in the form of a conventional planter along with the attachment plates of other units such that the soil ahead of each planting unit is conditioned.

Each mounting assembly includes spaced arms 18 which extend away from an associated rolling basket soil conditioning and leveling implement 10 which is journaled for rotation between the arms 18 as at 20. The arms 18 connect to the members 16 fixed to the attachment plate 12. The arms 18 are connected to each other by a common crossbar 24 which also supports one end of a cylinder or actuator 6.

Figure 4:
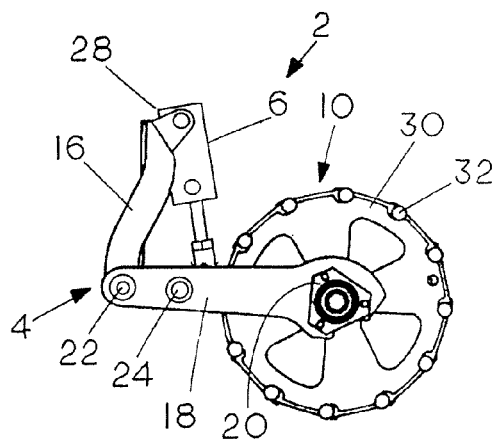
FIG. 4 shows a side view of the mounting assembly of FIG. 3.

As illustrated in FIGS. 3 and 4, the arms 18 and the members 16 of the attachment plate 12 are designed such that they pivotally connect to each other. Any manner known in the art which connects and enables the arms 18 to pivot at 22 relative to the members 16, such as bearings, bushings, etc., can be employed so that the adjustable mounting 4 is able to move towards and away from the surface of the ground with the operation of cylinder 6 which may be attached using a clevis arrangement as at 26 to attach the rod end and a bracket arrangement as at 28 to attach the blind end of the cylinder 6 to the attachment plate 12.

Figure 5:
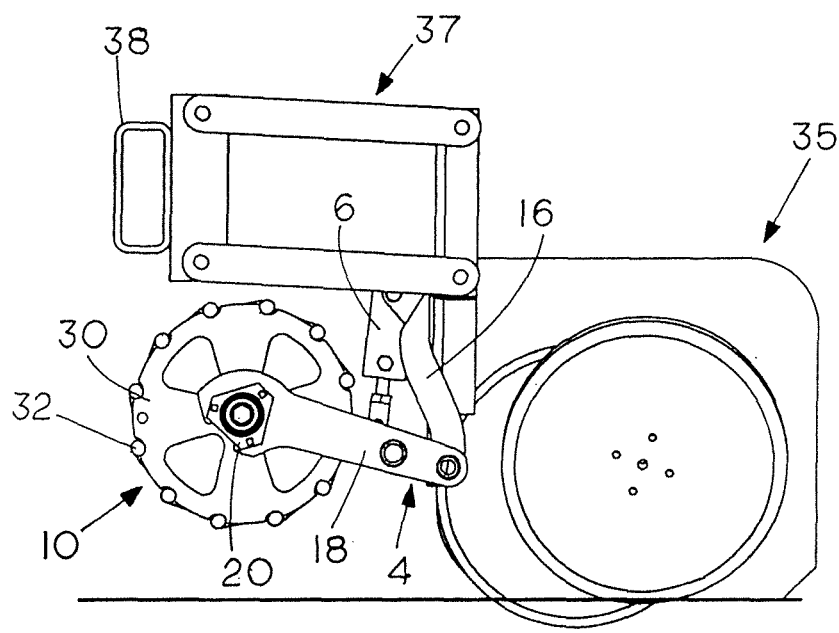
FIG. 5 illustrates the mounting assembly of FIGS. 3 and 4 attached to the front of a planting implement with the soil conditioning rolling basket shown in a raised position.

The height-adjusting actuator 6 may be a hydraulic or pneumatic cylinder, or other devices, as illustrated, those skilled in the art will recognize that any mechanical mechanism able to raise and lower the soil conditioning implement 10, as shown in FIGS. 5 and 6, may be used. Thus, in some embodiments, height adjusting depends on raising the planter with the rolling baskets attached. In those embodiments, downward force may be provided by a spring-operated mechanism, an inflatable air spring, or any similar system known in the art, such as are shown in FIGS. 9A-9D. As indicated, several preferred embodiments utilize pneumatic cylinders as compressed air is generally available on tractors to connect to and operate farm implements. It will be recognized, however, that hydraulic systems are also commonly used in these types of applications.

The rolling basket units 10 further include a pair of side plates 30 connected by a plurality of spaced steel bars 32 which may be internally or externally attached to the plates 30. A central spindle or axle 34 is also provided.

FIGS. 5, 6A, 6B, 7A and 7B also depict a planting implement 35 having a seed distributing arrangement 36 (FIG. 6B) and a connecting frame 37 including a main structural member 38 that connects together a plurality of similar units 35.

Figure 6A:
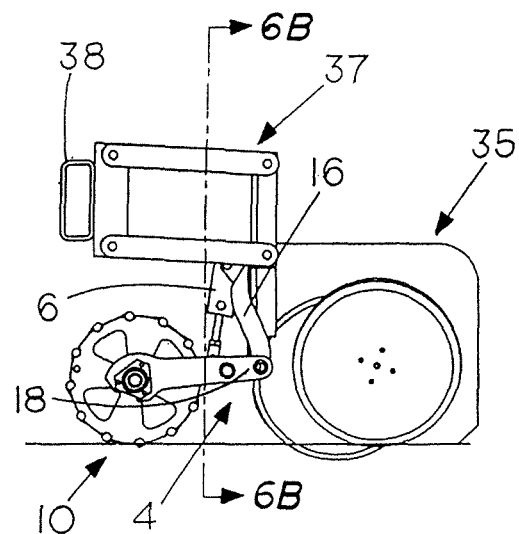
FIG. 6A is a view similar to FIG. 5 showing the soil conditioning rolling basket implement in a lowered ground engaging position.
Figure 6B:
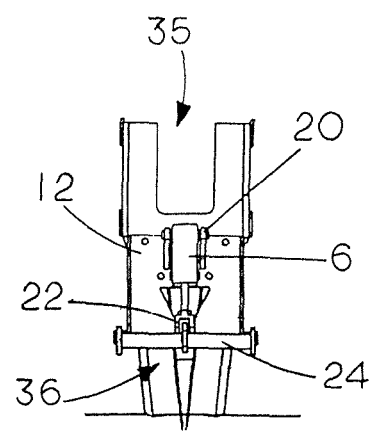
FIG. 6B is a cross-sectional view taken along line B-B of FIG. 6A.
Figure 10:
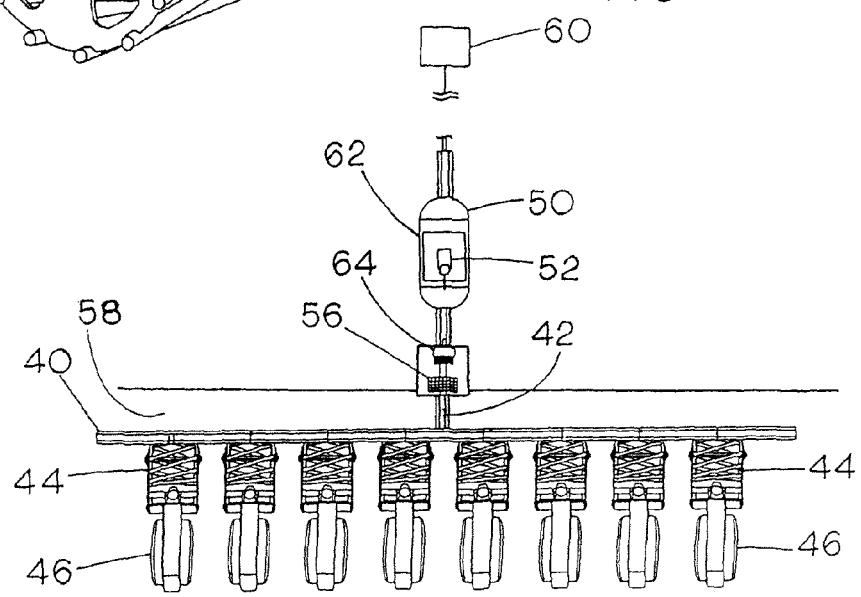
FIG. 10 is a block diagram of a pneumatic control system for controlling mounting assemblies and a schematic drawing of a rolling basket soil conditioning system combined with a multi-row planter.

As shown in FIGS. 5 and 6A, the operation of the actuator 6 serves to raise and lower the soil conditioning rolling basket implement 10 in accordance with the operation of a control system. It should be noted that in an implement carrying a plurality of soil conditioning rolling baskets 10, as shown in FIG. 10, an associated control system enables the raising and lowering of the soil conditioning implements individually as desired by the operator in the tractor or other towing vehicle. It may also enable the soil conditioning implement 10 to be positioned in a floating mode riding the soil surface or lowered with applied force as needed.

Figure 2:
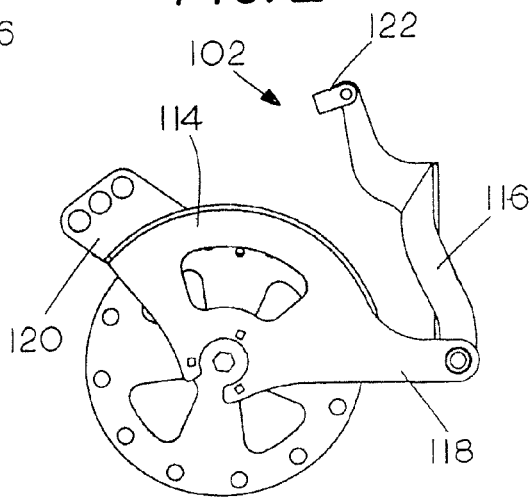
FIG. 2 shows a side view of the mounting assembly of FIG. 1.

An alternate embodiment of the mounting bracket assembly is shown generally at 102 in FIGS. 1 and 2 and also includes a height adjustable mounting 104. That system utilizes a shell or shroud 114 covering the upper portion of the rolling basket 110. Pivotally connected members 116 and arms 118 are shown together with mounting bracket 120 and clevis attachment 122. The actuating cylinder or other such device is not shown.

FIG. 10 is a schematic drawing of a soil conditioning system used with a multi-row seed planter so that a field may be properly leveled and thereafter receive seeds from the planter modules. In this schematic drawing, a tow bar 40 is connected to a trailer tongue 42 that is adapted to be connected by a clevis (not shown) to a towing work vehicle, such as a farm tractor. Secured to the tow bar are a plurality of rolling basket tillage devices 44.

Primary tillage devices (not shown) may, for example, comprise disk harrows or rake harrows of conventional design known in the art may be used prior to employing the rolling baskets. As previously explained, the primary harrows are arranged to dig deeper into the soil and typically produce clumps depending on soil type and moisture content. It is preferable that the clumps become crushed and broken up and the soil leveled by the action of the secondary rolling basket devices 44 leaving the field prepared to receive seed at the time of seeding and the seed distributed by planter modules 46.

The user or driver of the tractor or other prime mover determines whether the soil is too wet for the soil conditioning implements 2 to effectively work or not. If the soil is too wet, the user sends a signal via the control system, to activate the height-adjusting mechanism 4. In a preferred embodiment, the height adjusting mechanism is connected to a pneumatic system which has an air compressor 52 for maintaining a predetermined pressure in an accumulator 50. At least one pneumatic solenoid valve 58 is connected between the accumulator and each actuator 6 to control the application of the pressure supplied to the actuator 6. A manifold 58 in FIG. 10 is shown as supplying pressurized air, via solenoid valves 56, to one or more actuators 6 under control of electrical signals from an operator's controller module which includes a key pad control (which may be remote) at 60. A combined electrical and pneumatic connection is shown at 62 and a manifold controller is shown at 64. The system may incorporate a pressure regulator (not shown) to adjust the amount of force (from the pressurized air) applied to raise the soil conditioning implement.

Pressurized air is then supplied to the pneumatic cylinders 6 in a well known manner to the mounting assembly, which, in turn, will raise the soil conditioning implement if the user has determined the soil in that location is too wet for use, or lower the soil conditioning implement if the soil is suitable to use the soil conditioning implement. It will be appreciated that the cylinders 6 may be single or double acting with single acting cylinders used to raise the soil conditioning implements on the power stroke and allow the basket to float under its own weight when the pressure is released. Double acting cylinders can be used to fix the implement in a lowered position.

As also shown in FIG. 10, each of the plurality of rolling basket soil conditioning assemblies may be placed in front of each of a plurality of seed distribution units of a planter as at 46 to ready the soil to receive the seeds. Each of the mounting assemblies for the soil conditioners may be controlled individually or simultaneously with others. Also, groups of mounting assemblies may be controlled. If the mounting assemblies are controlled individually, the manifold 58 (either pneumatic or hydraulic), may supply pressurized air through the use of solenoid valves 56. The operator is able to control the height adjustment and so the application of one soil conditioning implement, a specific group of soil conditioning implements, or all of the soil conditioning implements using the control pad 60 in the cab of the tractor. As indicated, the control pad 60 may be any kind known in the art for sending control signals to solenoid or other pneumatic or hydraulic valves.

The system allows for maximum efficiency of the soil conditioning implements, for if one row or a few of the rows in a field are too wet, but the remaining rows are dry, the user may selectively apply the soil conditioning rolling basket implements to suitable rows. The user, therefore, is able to maximize the effect of using rolling basket soil conditioning devices in a field.

Figure 7A:
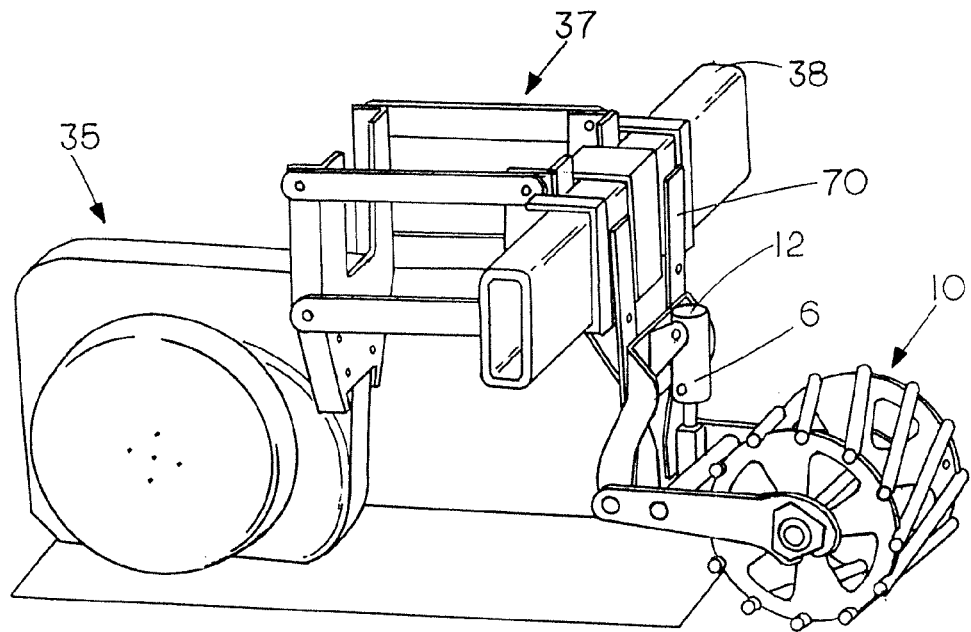
FIG. 7A is a schematic perspective view showing a rolling basket attached to a main frame member of a planter implement.
Figure 7B:
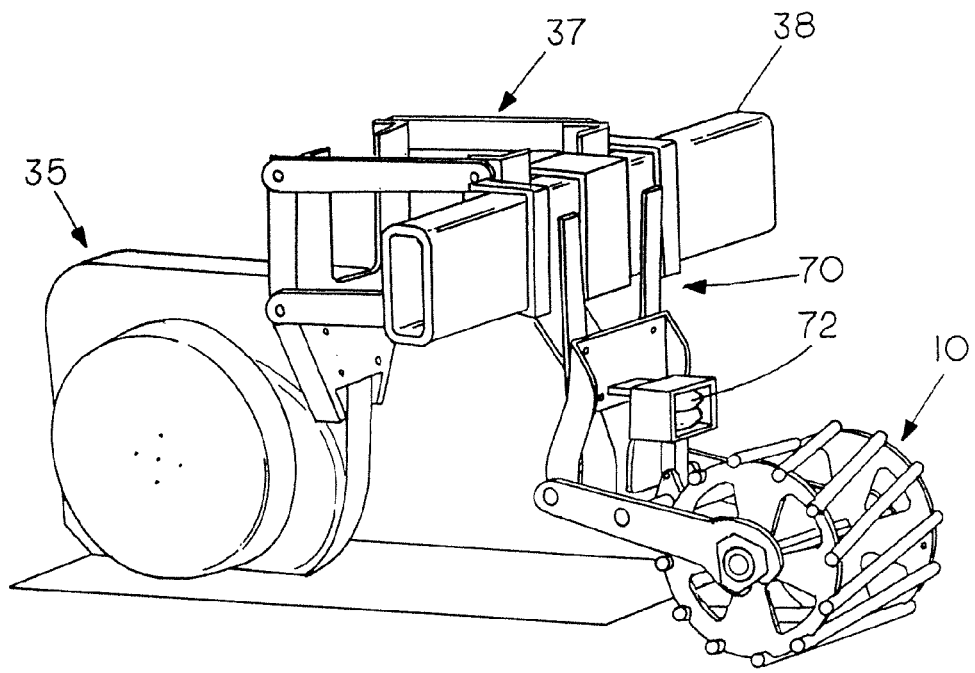
FIG. 7B is a view similar to FIG. 7A with a double acting airbag as the actuator.
Figure 8:
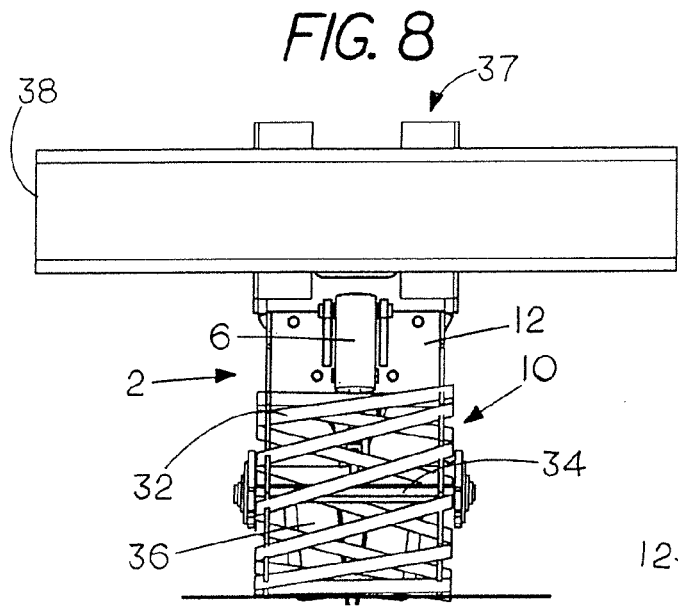
FIG. 8 is a front view of the mounting assembly of FIGS. 3-7 attached to a farming implement.

FIG. 7A depicts a rolling basket device 10 in accordance with the invention fixed to the main structural member 38 of a planting implement, a unit of which is shown at 35 in which the attachment plate 12 is attached to the member 38 by an additional framework 70. A similar arrangement is shown in FIG. 7B in which the actuator is a double acting airbag system as at 72.

Figure 9A:
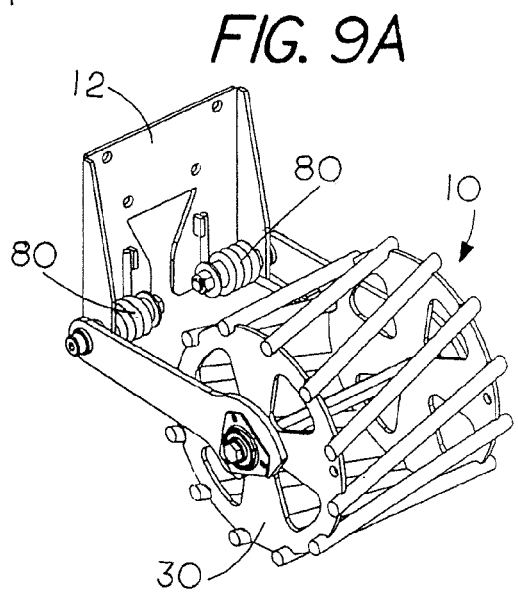
FIGS. 9A-9F depict other embodiment of rolling baskets similar to those of FIGS. 1 and 3 using other types of actuating or force-applying devices.
Figure 9B:
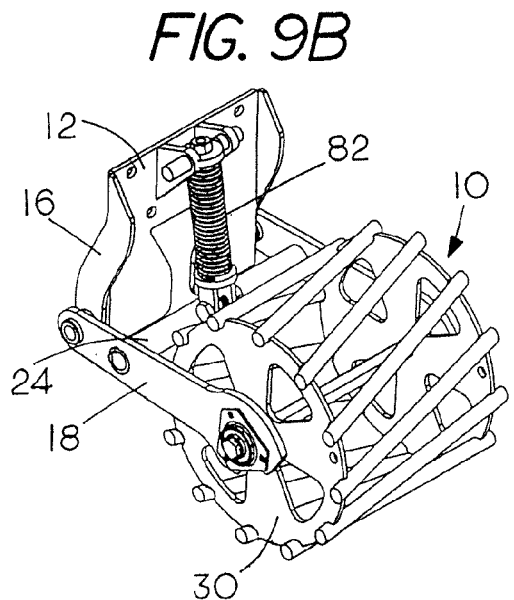
Figure 9C:
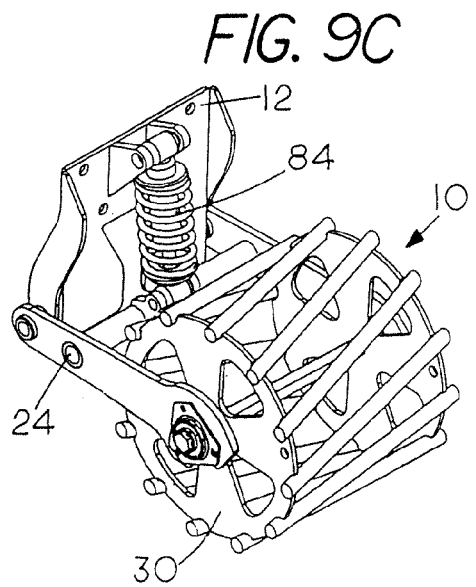
Figure 9D:
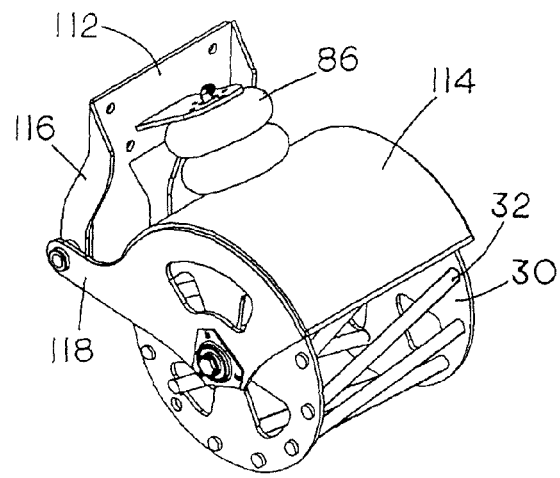
Figure 9E:
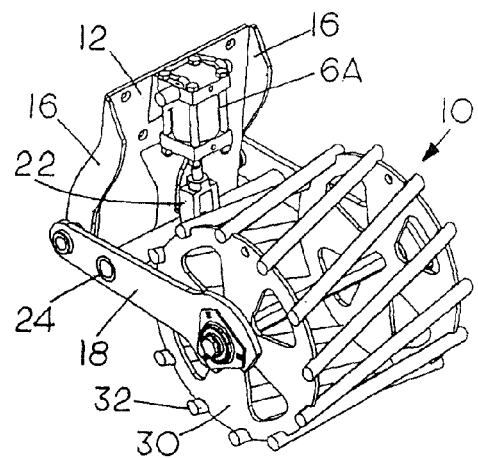

FIGS. 9A-9E depict alternative actuator devices used in combination with the rolling baskets. They include a pair of torsion springs as at 80 in FIG. 9A which are used to provide an amount of downward force on the rolling basket 10. Similarly, FIG. 9B utilizes a compression spring 82 connected between mounting plate 12 and cross member 24. A spring and shock absorber arrangement 84 is shown in FIG. 9C and a single acting airbag or air shock absorber is shown in FIG. 9D.

Figure 9F:
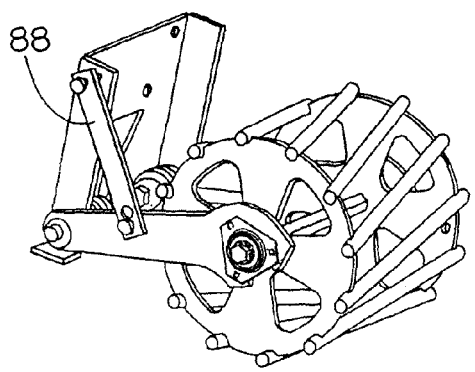

It should be noted that rolling baskets having mounting arrangements with devices providing downward force only are normally raised manually when they need to be out of contact with the soil. They are held in a raised position using a manually-operated latch system such as is at 88 shown in FIG. 9F.

Another embodiment is shown in the several views of FIGS. 11A-16 in which dual airbags or inflatable pneumatic actuators are used to lower or deploy and raise or retract the rolling basket. This rolling basket system is shown generally at 200 and includes a rolling basket 202, which is mounted to a height-adjusting mechanism 204 using a pair of spaced parallel side plate members 206 and 208, which are fixed to a lower assembly 210, which includes a main member 212, which may be in the form of a heavy tube member, and which connects to the side plate members 206 and 208. The lower assembly, with the side plate members 206 and 208, in turn, pivots around a pair of spaced, shoulder bolts 214, which connect it to a mounting structure including shaped members 216 fixed to or are part of attachment or mounting plate 218, which, in turn, can be fastened to a main implement such as a multi-row planter, as shown in FIG. 10, at a plurality of places 220 using conventional bolts, or the like, as at 221.

The rolling basket system further includes a down force or deployment airbag arrangement that includes a down force or deployment airbag 222 mounted between a bottom pedestal 224 and a fixed upper bracket 226. The bottom pedestal is mounted to the lower assembly by spaced members 228 and spaced fulcrum members 230 which are fixed to member 212 and members 228 and 230 connected by opposed shoulder bolts 232 such that the pedestal can pivot freely on the shoulder bolts.

Figure 12A:
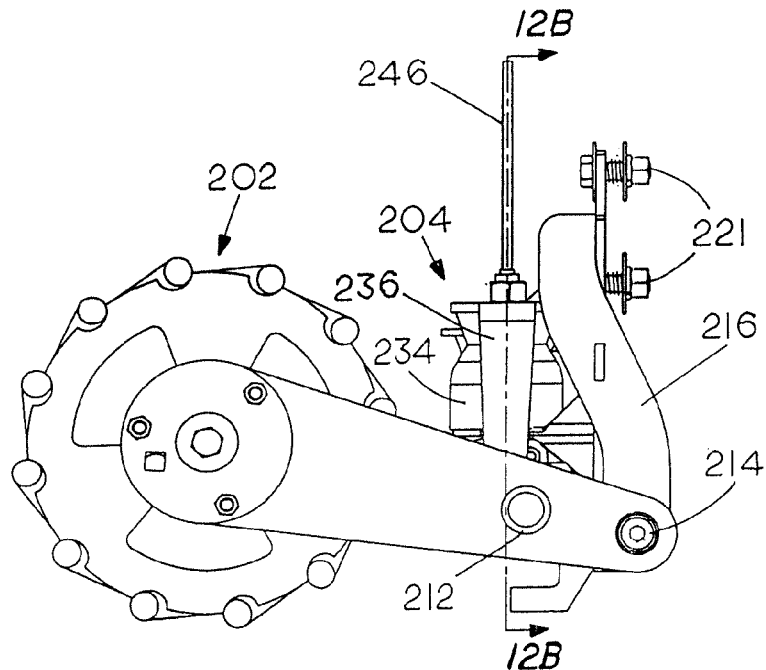
FIG. 12A is a side elevation view of the embodiment of FIG. 11A shown with the rolling basket in the raised or retracted position.
Figure 12B:
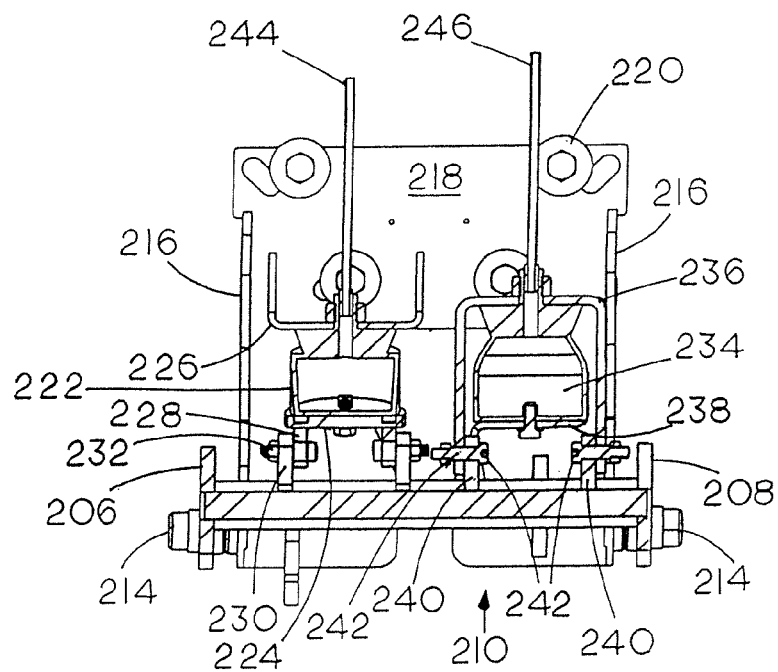
FIG. 12B is a sectional view taken along line 12B-12B in FIG. 12A.
Figure 13A:
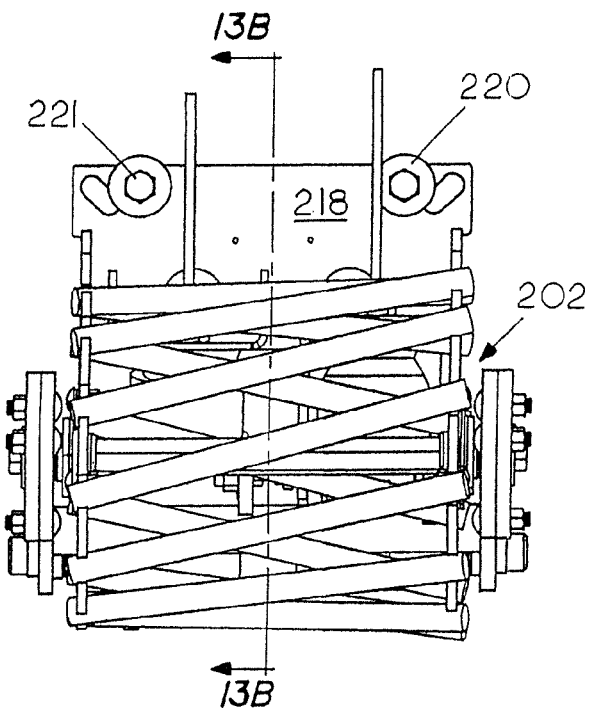
FIG. 13A is a front elevation view of the embodiment of FIG. 11A shown with the rolling basket in the raised or retracted position.
Figure 13B:
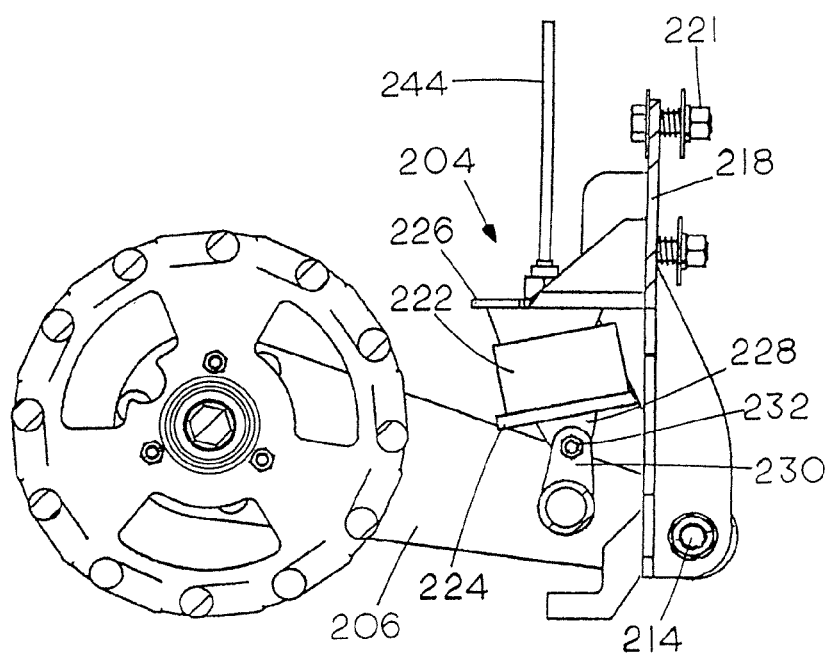
FIG. 13B is a sectional view taken along line 13B-13B of FIG. 13A.
Figure 14A:
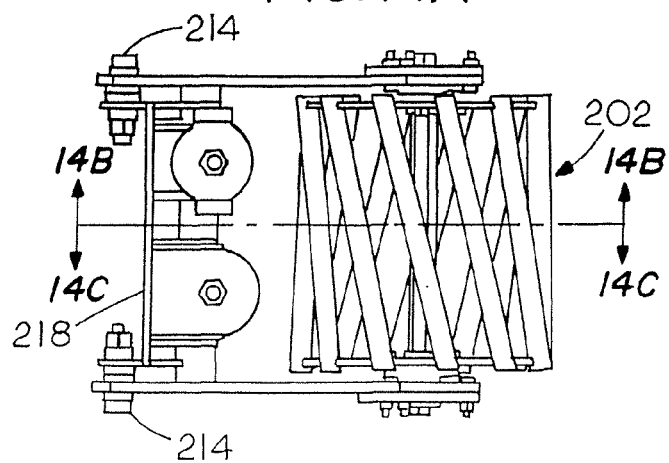
FIG. 14A is a top plan view of the embodiment of FIG. 11A showing the rolling basket in the up or retracted position.
Figure 14B:
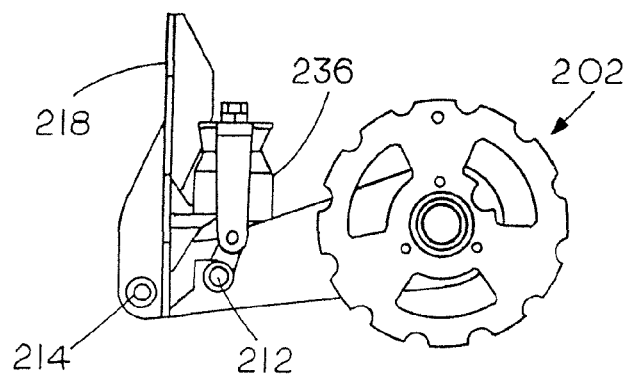
FIGS. 14B and 14C are opposed sectional views along lines 14B-14B and 14C-14C, respectively of FIG. 14A.
Figure 14C:
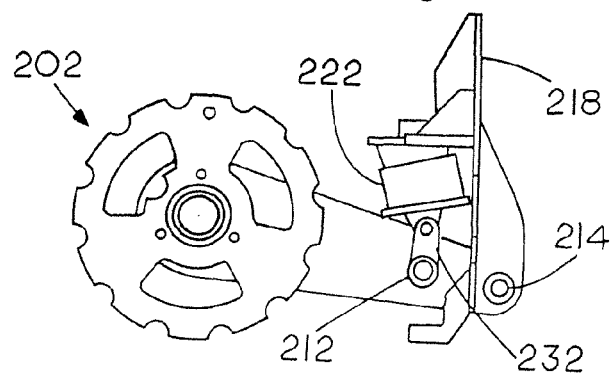
Figure 15A:
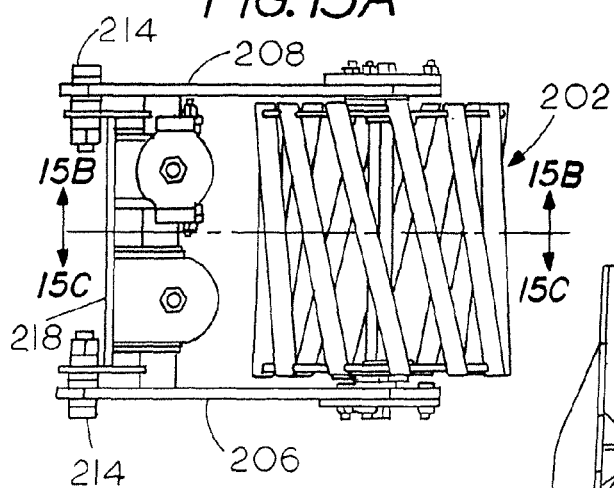
FIG. 15A is a top plan view similar to FIG. 14A with the rolling basket in the down or deployed position.
Figure 15B:
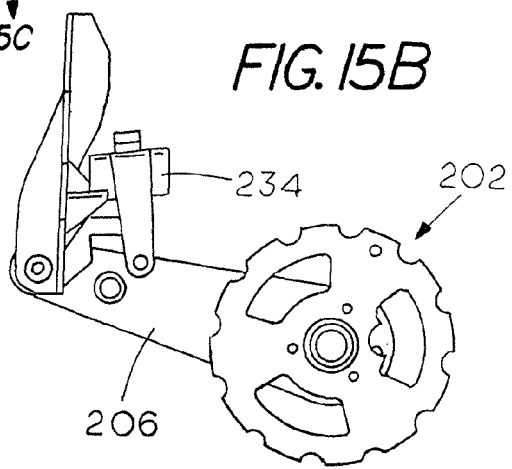
FIGS. 15B and 15C are opposed sectional views along 15B-15B and 15C-15C, respectively of FIG. 15A.
Figure 15C:
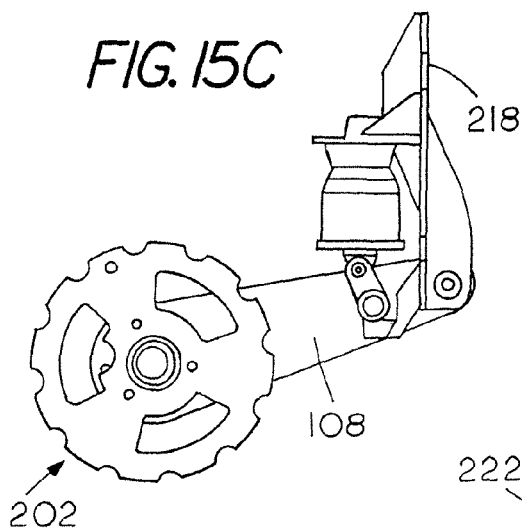
Figure 16:
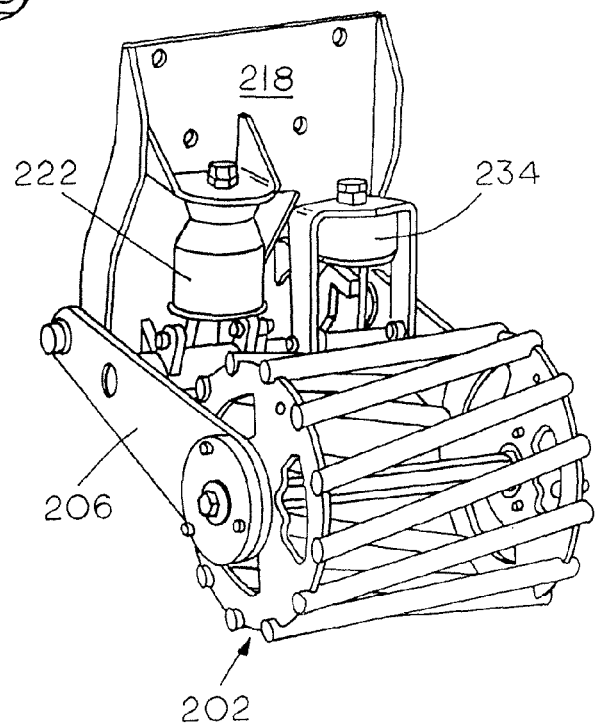
FIG. 16 is a front perspective view of the embodiment of FIG. 11A showing the rolling basket in the raised or lowered or deployed position.

The system further includes an up force or retraction airbag arrangement that includes an up force or retraction airbag 234 that is mounted between a moving upper U-shaped bracket 236 and a bent flange member 238. As best seen in FIG. 12B, spaced legs of bracket 236 are also fixed to the lower assembly 210 by spaced fulcrum plates 240 which are fixed to member 212 and the spaced legs of bracket 236 are connected pivotally to fulcrum plates 240 by opposed shoulder bolts 242 on which the bracket 236 can pivot freely.

Air lines 244 and 246 are connected respectively to down force and up force airbags 222 and 234 and to a conventional supply of pressurized air not shown. The system is configured so that, when high pressure air is introduced to inflate one bag, the other bag can deflate.

Figure 11A:
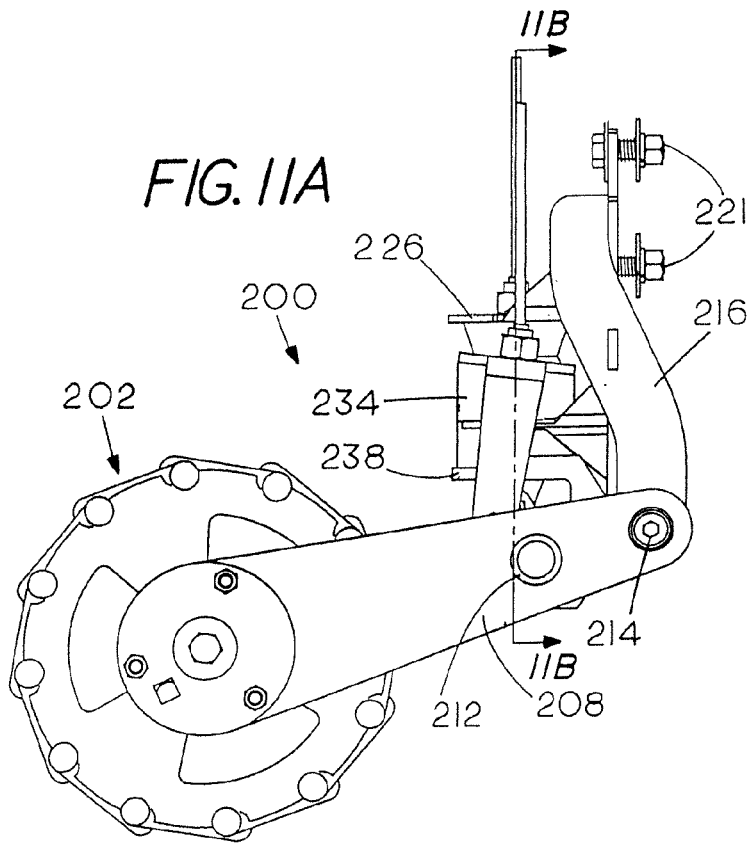
FIG. 11A is a side elevation view of an alternate embodiment of the invention using a dual airbag deployment/retraction system shown with the lower assembly and rolling basket in the down or deployed position.
Figure 11B:
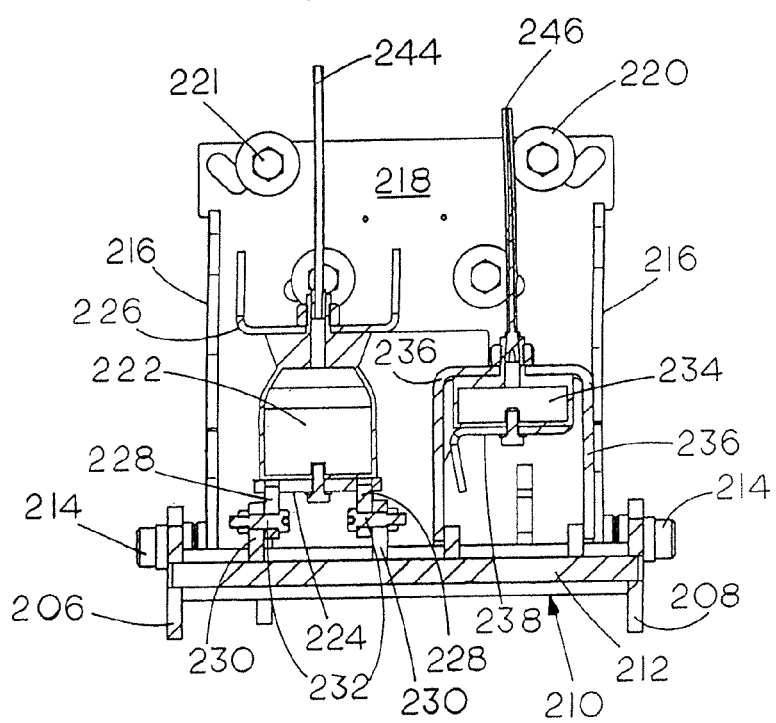
FIG. 11B is a view taken along section lines 11B-11B in FIG. 11A.

FIGS. 11A, 11B and 15A-15C show the lower assembly 210 and basket 202 in the deployed or down position with the down force airbag fully inflated. As the down force bag 222 inflates, it causes the lower assembly to pivot downward and deploy the basket 202 downward. The act of the lower assembly moving downward causes the bracket 236 connected to lift bag 234 to be displaced downward forcing air out of and collapsing the lift bag, as shown in FIG. 11B. Conversely, as shown in FIGS. 12A, 12B, 13B and 14A-C, to raise or retract the lower assembly 210 and basket 202, the lift bag 234 is fully inflated, which causes the bracket 236 to move upward and the lower assembly to rotate upward about shoulder bolts 232 and 214, which, in turn, causes the bottom pedestal 224 to be displaced upward and this collapses or deflates down force airbag 222. The lifting force of the airbag 234 is transferred to the lower assembly 210 through bent flange 238. Shoulder bolts 242 connect the legs of bracket 236 with fulcrum members 240.

It will become apparent that each of the shoulder bolts that transfer force from the airbags to the lower assembly travel pivotally about a fulcrum, as best shown at 230 and 242 in the figures. The fulcrums, in turn produce an arcuate motion of the side plate members 206 and 208, as they raise and lower member 212 and the lower assembly. In that manner, the lower assembly travels along the arc of a circle when deployed and retracted with the main shoulder bolts 214 as pivots.

FIGS. 17A-17C and 18A-18B depict a five-port air valve assembly in two alternate positions. The assembly, generally at 300, includes ports 302, 304, 306, 308 and 310 and cylinder 312, housing axially adjustable cylinder valve 314. The valve body or block is depicted at 316. Ports 302 and 306 are connected to receive air from a high pressure air source such as a conventional compressor system (not shown). Ports 308 and 310 connect respectively to the up force airbag and the down force airbag. Finally, port 304 is a vent port for venting air from either the up force airbag or the down force airbag.

Figure 17A:
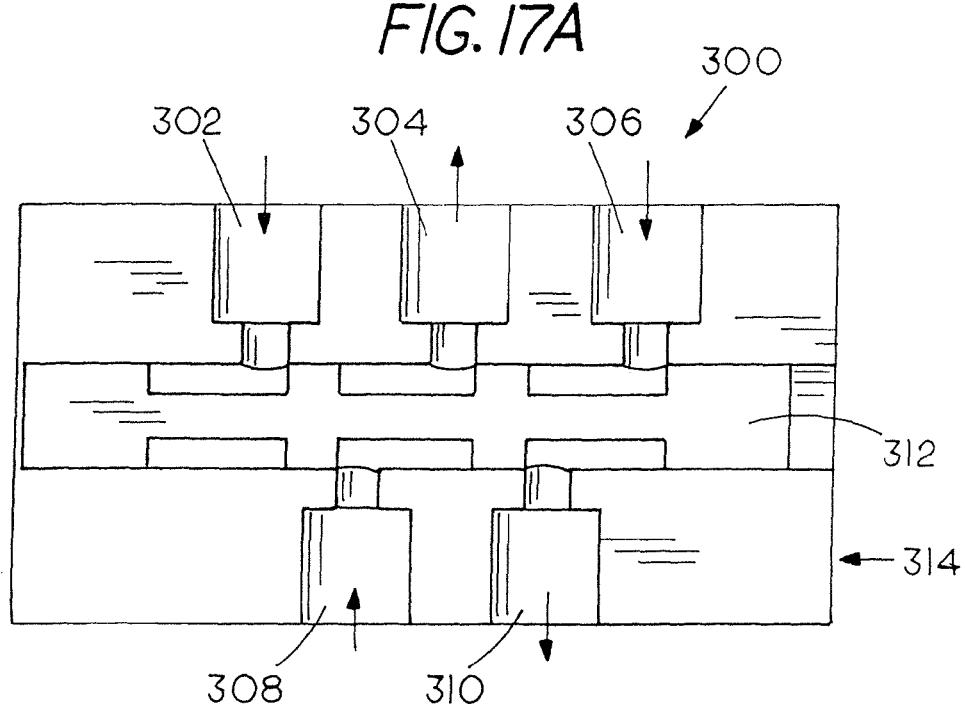
FIG. 17A shows a schematic view of a five-port air valve assembly in accordance with the invention shown in a first position that enables the down force airbag to inflate and the up force airbag to collapse.
Figure 17B:
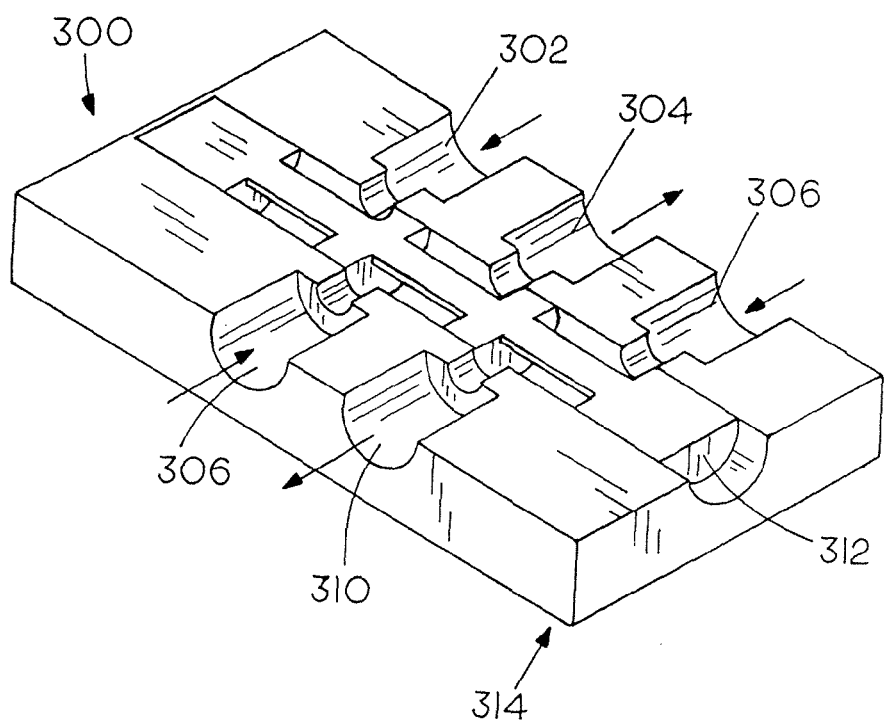
FIG. 17B is a perspective sectional view of the air valve assembly of FIG. 17A taken half way through the valve body or block.

In FIGS. 17A and 17B, the port receiving high pressure air 306 is connected through the valve block with down force bag 222 through outlet port 310 with the central valve 312 shifted to the left in cylinder 314 in a first position. shifted to the left. With the central cylinder in this position, up force airbag 234 is connected to the vent port 304 via port 308 so that up force airbag 235 is enabled to collapse while down force airbag 222 inflates. This deploys the rolling basket against the ground.

Figure 18A:
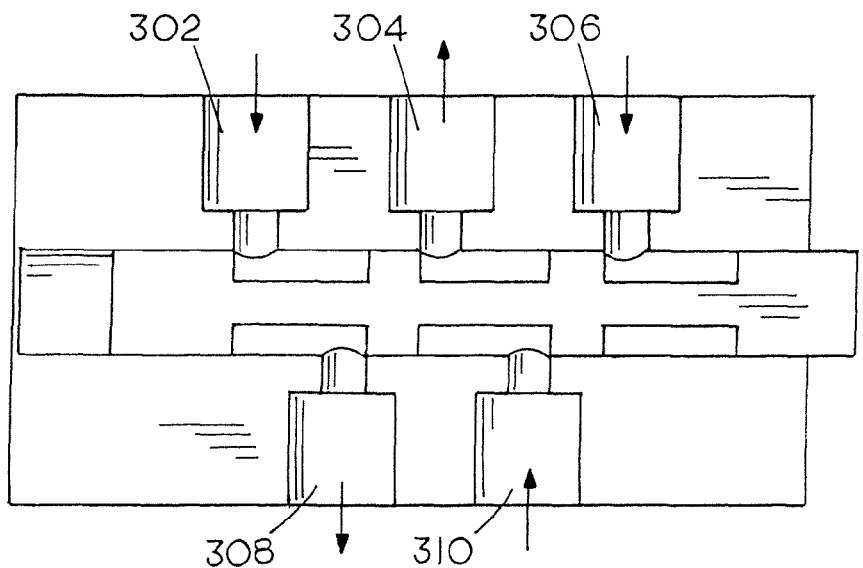
FIG. 18A depicts a schematic view of the valve assembly of FIG. 17A in a second position that enables the up force airbag to inflate and the down force airbag to collapse.
Figure 18B:
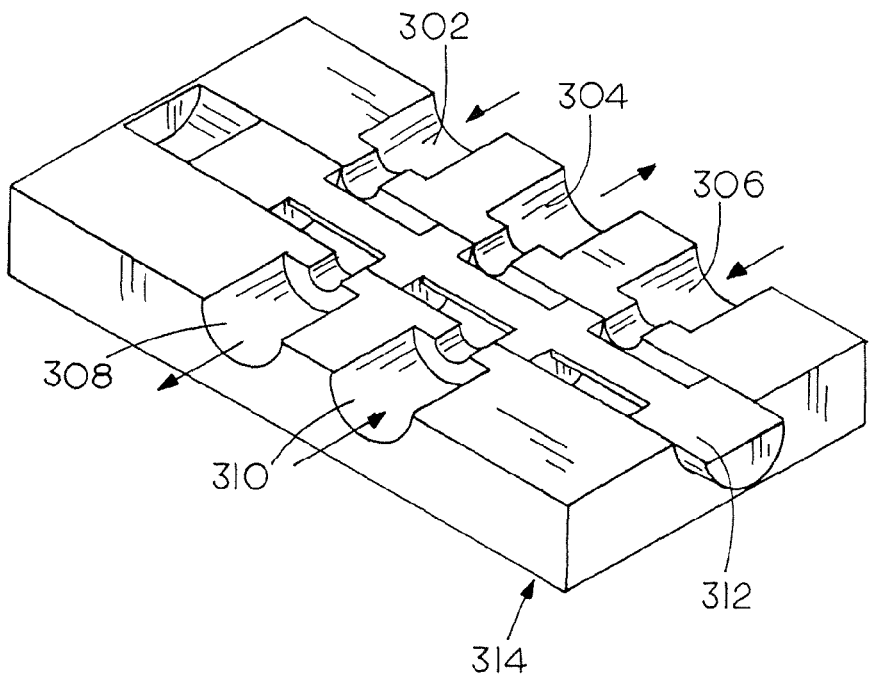
FIG. 18B is a perspective sectional view of the air valve assembly of FIG. 18A taken half way through the valve body or block.

FIGS. 18A and 18B show the valve 312 in an alternate position with the central cylinder moved to the right. With the central in this position, port 302 is connected through the central cylinder to port 308 and port 310 is connected to the central cylinder to port 304 and port 306 is deadheaded. With the valve in this position, the source of high pressure air is connected through ports 302 and 308 to the up force airbag and the down force is connected to vent through ports 310 and 304. This will enable the up force airbag to inflate and the down force airbag to collapse in accordance with raising the rolling basket to an up or stowed position.

Another embodiment is shown and illustrated in the several views of FIGS. 19A-23B which, like the embodiment shown in FIGS. 11A-16 employs dual airbags or inflatable pneumatic actuators to lower (deploy) and raise (retract) an agriculture implement. In this embodiment, the implement is a trash whipping-type device. As shown in FIGS. 19A-19F, 20A-20C, 21A-21C and FIGS. 23A and 23B, the trash whipping system, generally at 400, includes a pair of spiked disks 402 and 404 with dirt guards 406 and 408, respectively, mounted on a triangular mount 410 (FIG. 23A) by means of a pair of bent flanges 412 and 414. A main mounting cross member, preferably a tube member, is shown at 416 and a connecting tube 418 has a fixed end fixed to the main mounting tube 416 and a free end that carries the triangular mount 410. The connecting tube is preferably connected directly to the back of the flanges 412 and 414 as by welding. The main member 416 is connected to a mounting structure by heavy side plate members 420 and 422. As with other embodiments, side plate members 420 and 422 pivot around a pair of spaced shoulder bolts 424 which connect the members 420 and 422 to the mounting structure including shaped members 426, which are fixed to or are a part of attachment or mounting plate 428 which, of course, can be fastened to a main implement such as a multi-row planter with a plurality of other spaced trash whipping systems at a plurality of places using conventional bolts, or the like, using openings 430. A similar system is shown in FIG. 10 with respect to rolling basket embodiments.

It will be appreciated that the mounting system of the invention can be used with many different disk varieties and those shown at 402 and 404 are for illustration purposes. They can be used with or without dirt guards also.

The trash whipping system further includes a down force or deployment airbag arrangement that includes a down force or deployment airbag 432 mounted between a bottom pedestal 434 and a fixed upper bracket 436. The bottom pedestal is mounted to the lower assembly by spaced members 438 and spaced fulcrum members 440 which are fixed to member 416 and members 438 and 440 connected by opposed shoulder bolts 442 such that the pedestal can pivot freely on the shoulder bolts.

Figure 19A:
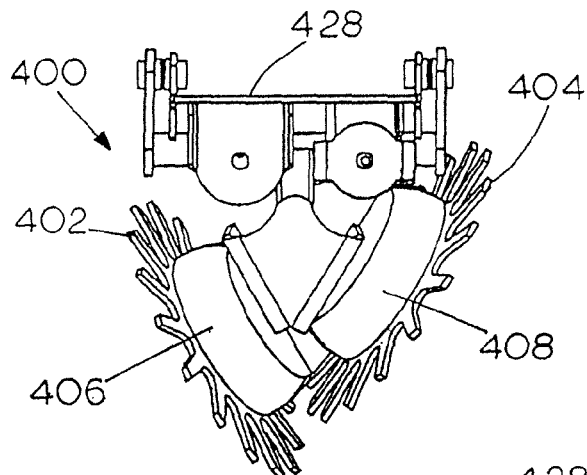
FIGS. 19A-19F represent respective top, left side elevation, front elevation, right side elevation, bottom and perspective views of a trash whipping attachment for a planter with a pneumatic dual airbag deployment/control system shown with airbags removed for clarity.
Figure 19B:
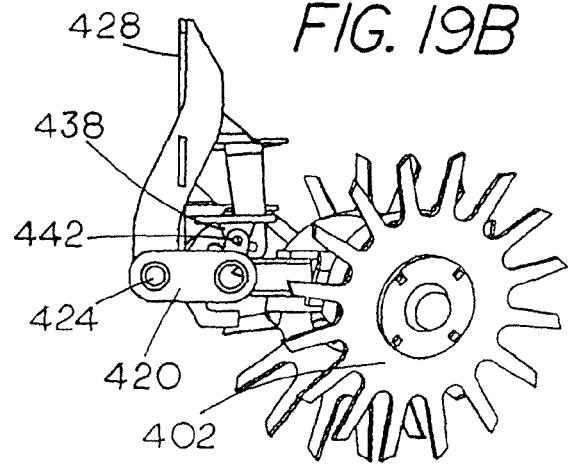
Figure 19C:
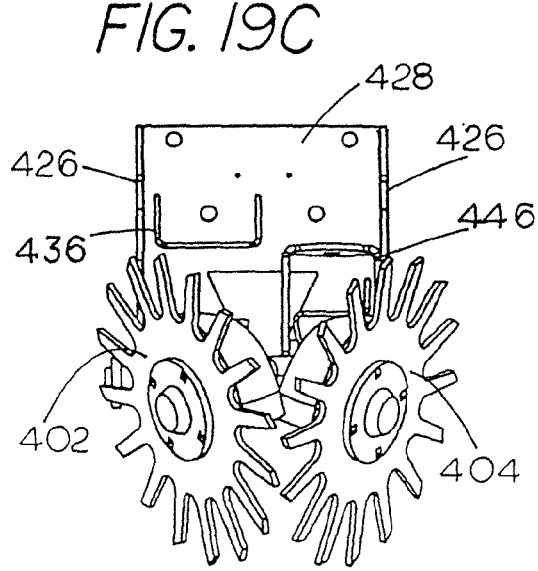
Figure 19D:
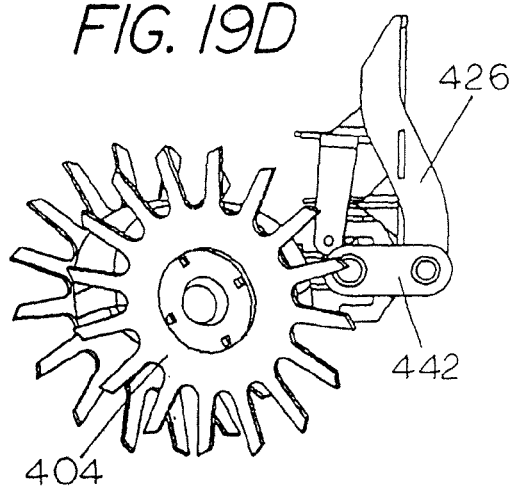
Figure 19E:
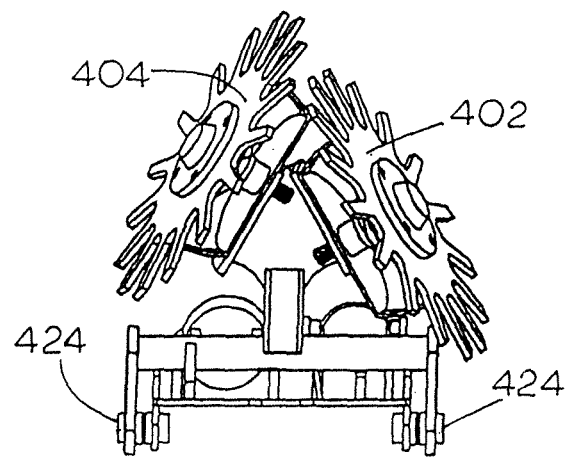
Figure 19F:
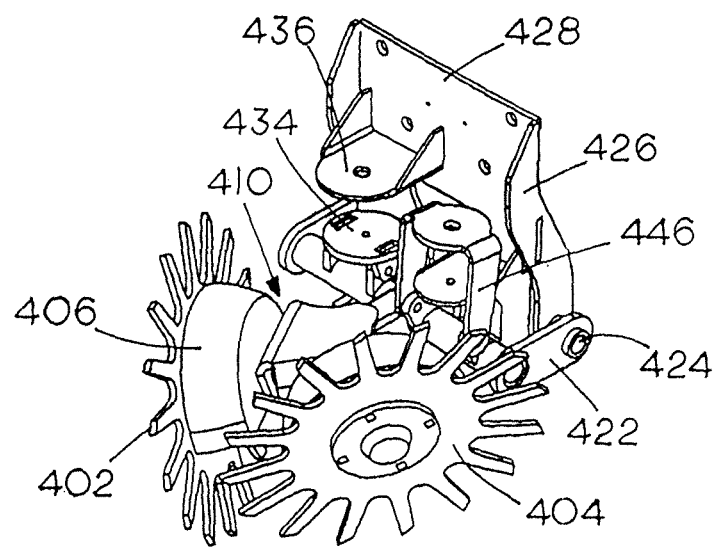
Figure 21A:
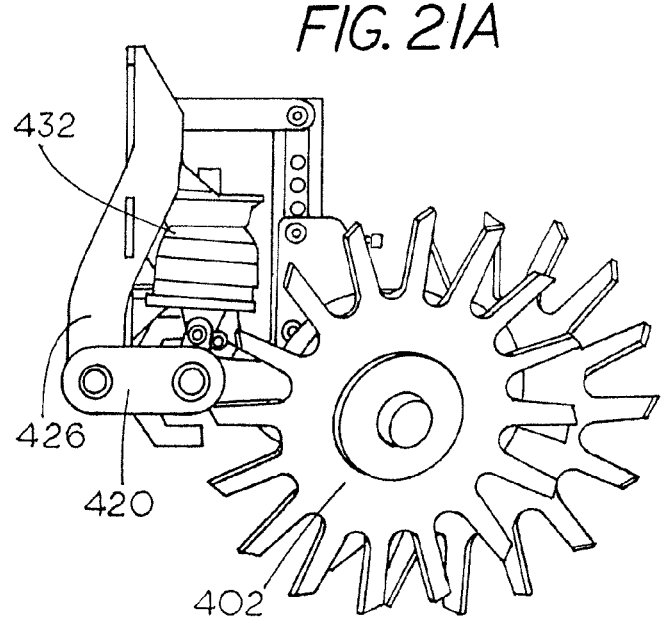
FIGS. 21A, 21B and 21C are, respectively, views similar to FIGS. 20A, 20B and 20C with trash whipping disks attached.
Figure 21B:
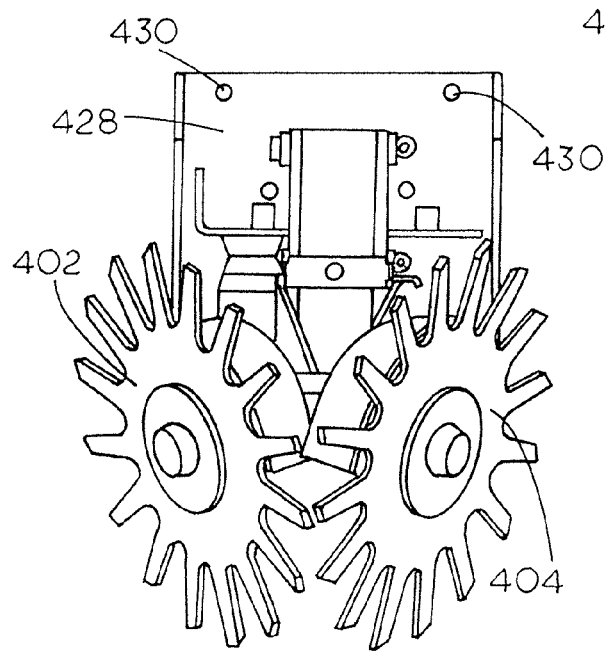
Figure 21C:
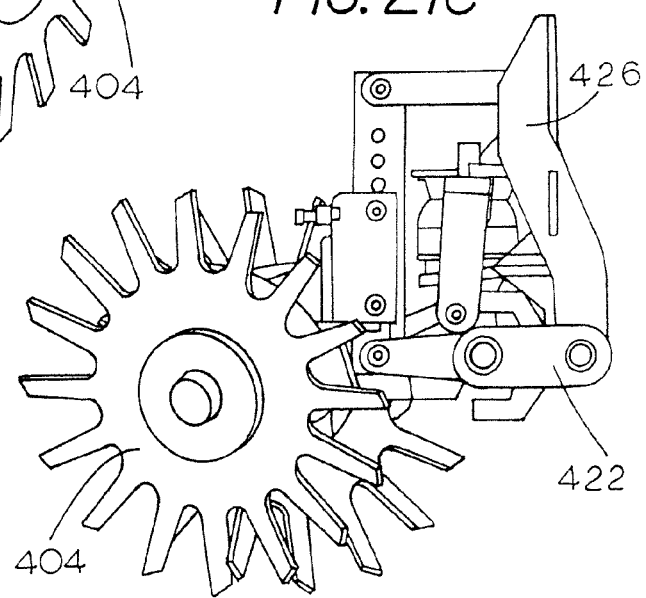

The system further includes an up force or retraction airbag arrangement that includes an up force or retraction airbag 444 that is mounted between a moving upper U-shaped bracket 446 and a bent flange bracket member 448. As best seen in FIGS. 19F, 20A and 21C, spaced legs of bracket 446 are also fixed to the lower assembly main tube 416 by spaced fulcrum plates 450 which are fixed to member 416 and the spaced legs of bracket 446 are connected pivotally to fulcrum plates 450 by opposed shoulder bolts 424 on which the bracket 448 can pivot freely.

Air lines are connected respectively to down force and up force airbags 432 and 444 and to a conventional supply of pressurized air (not shown). The system is configured, as will be described.

Figure 22:
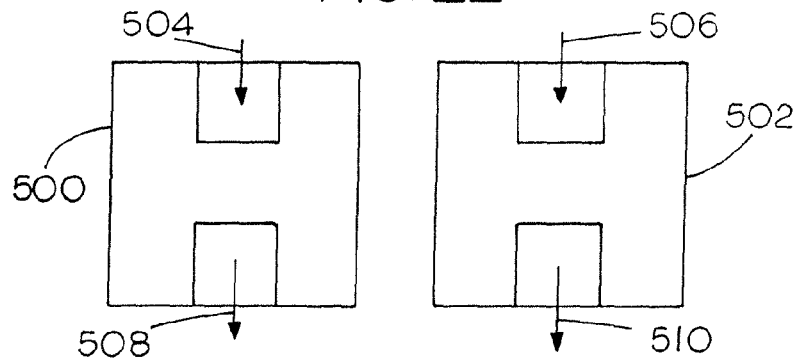
FIGS. 22 is a schematic view of an electronic pneumatic regulator, and manual pneumatic regulator illustrating the positioning operation of the associated trash whipping device.
Figure 23A:
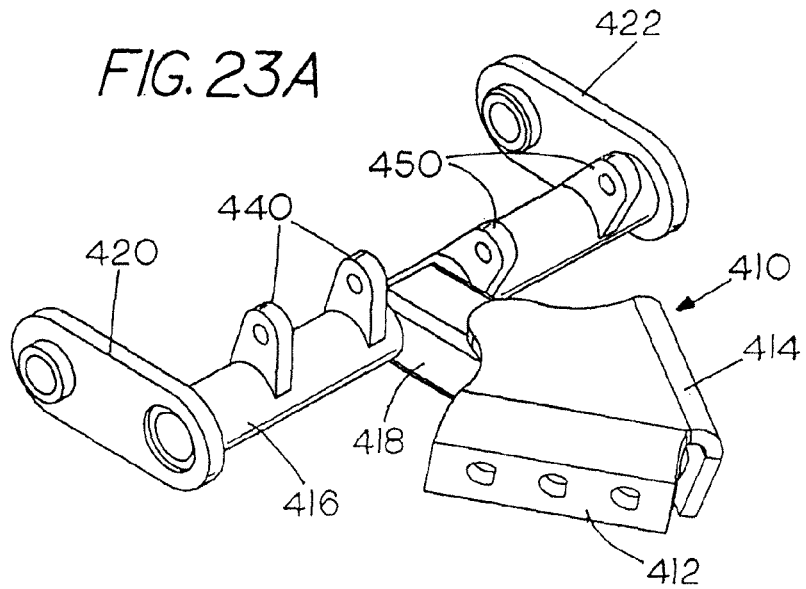
FIGS. 23A and 23B are perspective and front views of a lower assembly for attaching trash whipper disks.
Figure 23B:
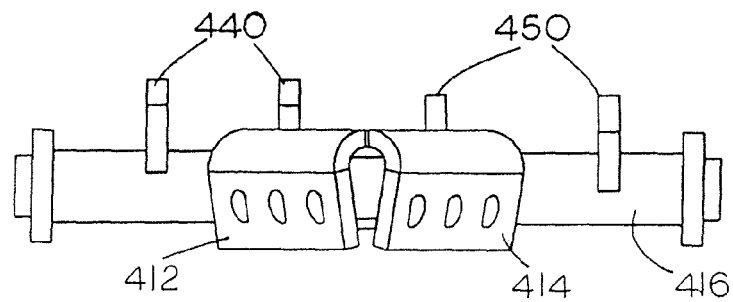

FIG. 22 depicts a control system for the trash whip assembly in the lifted or stowed position. The system includes an electronic regulator 500 which can be set to control output pressure and thus, the pressure in a connected airbag over a wide range. A manual regulator is shown at 502.

In FIG. 22, air coming from a supply such as a compressor accumulator tank (not shown) is supplied to regulators 500 and 502 at 504 and 506, respectively. Output streams from the regulators 500 and 502 are shown, respectively, at 508 and 510.

In the diagram of FIG. 22, the down force pressure supply 516 entering port 506 is supplied constantly at a suitable pressure to act as a shock absorber to the down force airbag through 510, typically, 18-20 lbs. Air is supplied to adjustable electronic regulator 500 through an input port at 504 and air is supplied to up force airbag through an output port at 508. It will be appreciated, however, that air is being supplied to both the down force airbag and the lift airbag.

With air being supplied to both the lift and down force airbags, a state of equilibrium can be achieved and maintained with the whipping device in any desired position of mechanical resistance with respect to the deployed mechanism. This disposition also allows the operator to vary the net upward or downward force as desired using the electronic regulator 500. Of course, the electronic regulator 500 can also be replaced by a manual control, if desired. In this manner, the trash whipping device can be controlled to exert any desired downward force or be controlled to float, just skimming the top of the soil. This achieves a continuous operator-directed control over the operation of the trash whipping device which has been demonstrated to be highly successful. It will be appreciated that other implements could be mounted on and controlled by this system.

Figure 24:
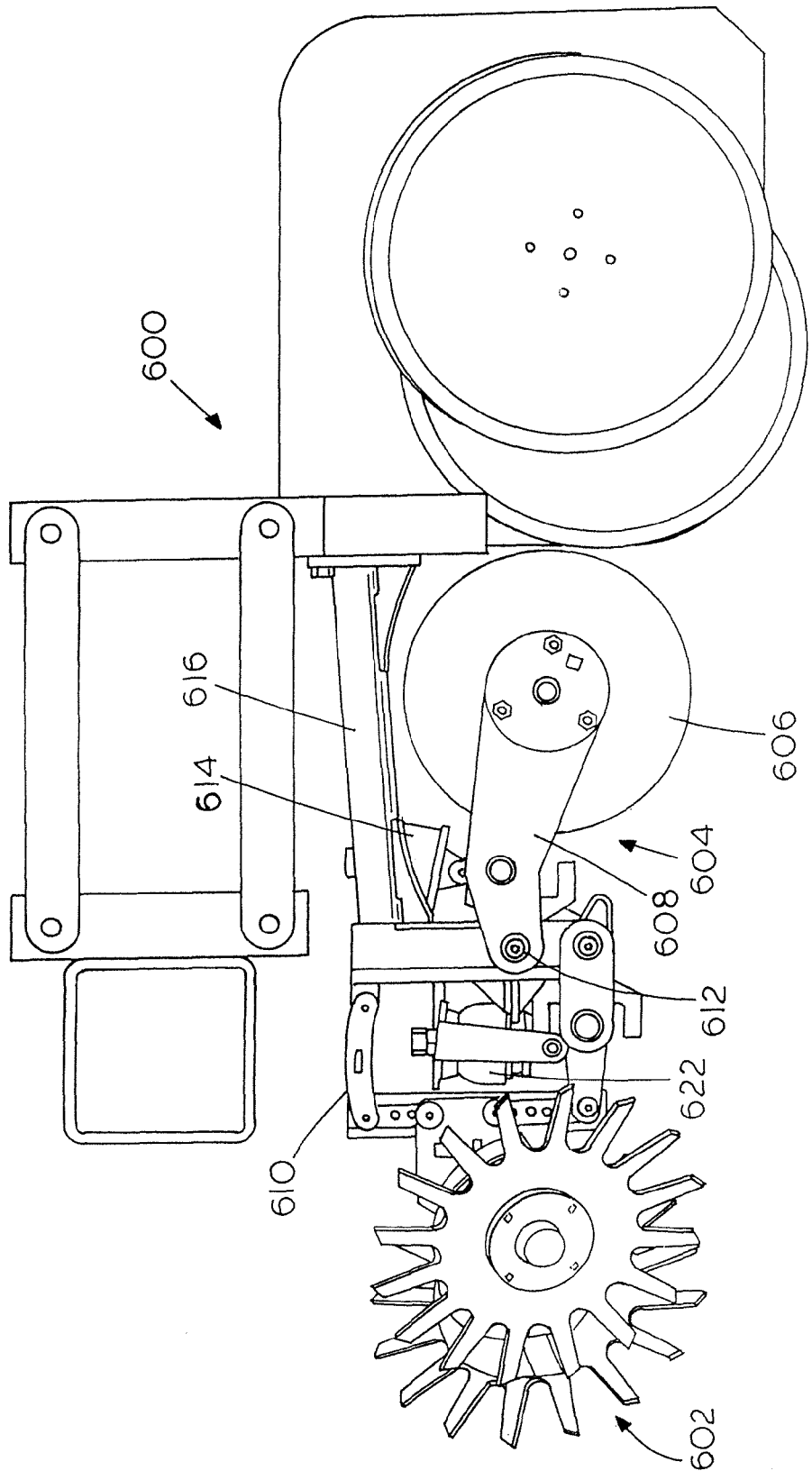
FIG. 24 is a side elevational view that depicts a trash whipping device mounted ahead of a coulter disk using a common mounting assembly with the coulter device having a down force only airbag deployment system and the trash whipping device having dual airbags.

FIG. 24 is a side elevational view including a planting implement, generally at 600, which may be a conventional commercial planter. The drawing depicts a trash whipping device 602 which may be similar to those previously described and a coulter device 604 which includes a blade or wheel 606 attached via a mounting member 608 to a mounting structure or assembly 610. Raising and lowering of the coulter device 604 is enabled via rotation of the member 608 about a joint 612. An inflatable airbag for applying a downward force to deploy the coulter disk 606 is shown at 614. The mounting assembly 610 carries both the trash whipping device and the coulter.

Figure 25:
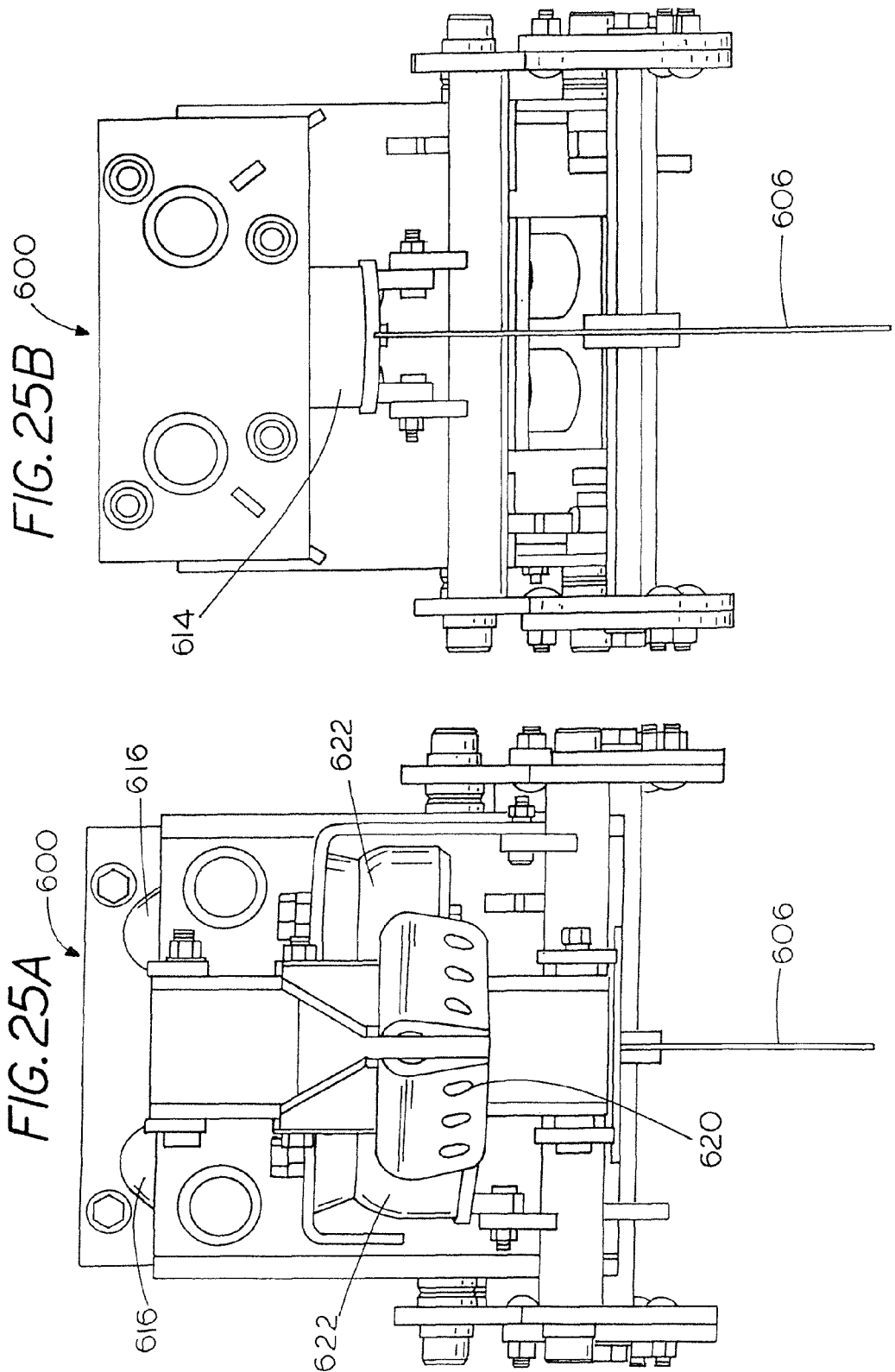
FIGS. 25A and 25B depict front and rear elevational views respectively of the embodiment of FIG. 24 with the trash whipping disks removed.

A front view of the assembly of FIG. 24 is shown in FIG. 25A with the trash whip disks removed revealing the triangular mount 620 and a pair of dual airbags 622 employed to raise and lower the trash whip in a manner as previously described for other embodiments. In FIG. 25B, a rear view is depicted showing single airbag 614 which may be utilized when desired to apply a downward force on coulter disk blade 606. When the downward force is released, the coulter device will simply ride along on top of the soil. As shown in FIG. 24, the common mounting assembly 610 is connected to the planting device 600 by a pair of members 616 shown in FIG. 25A.

Figure 26:
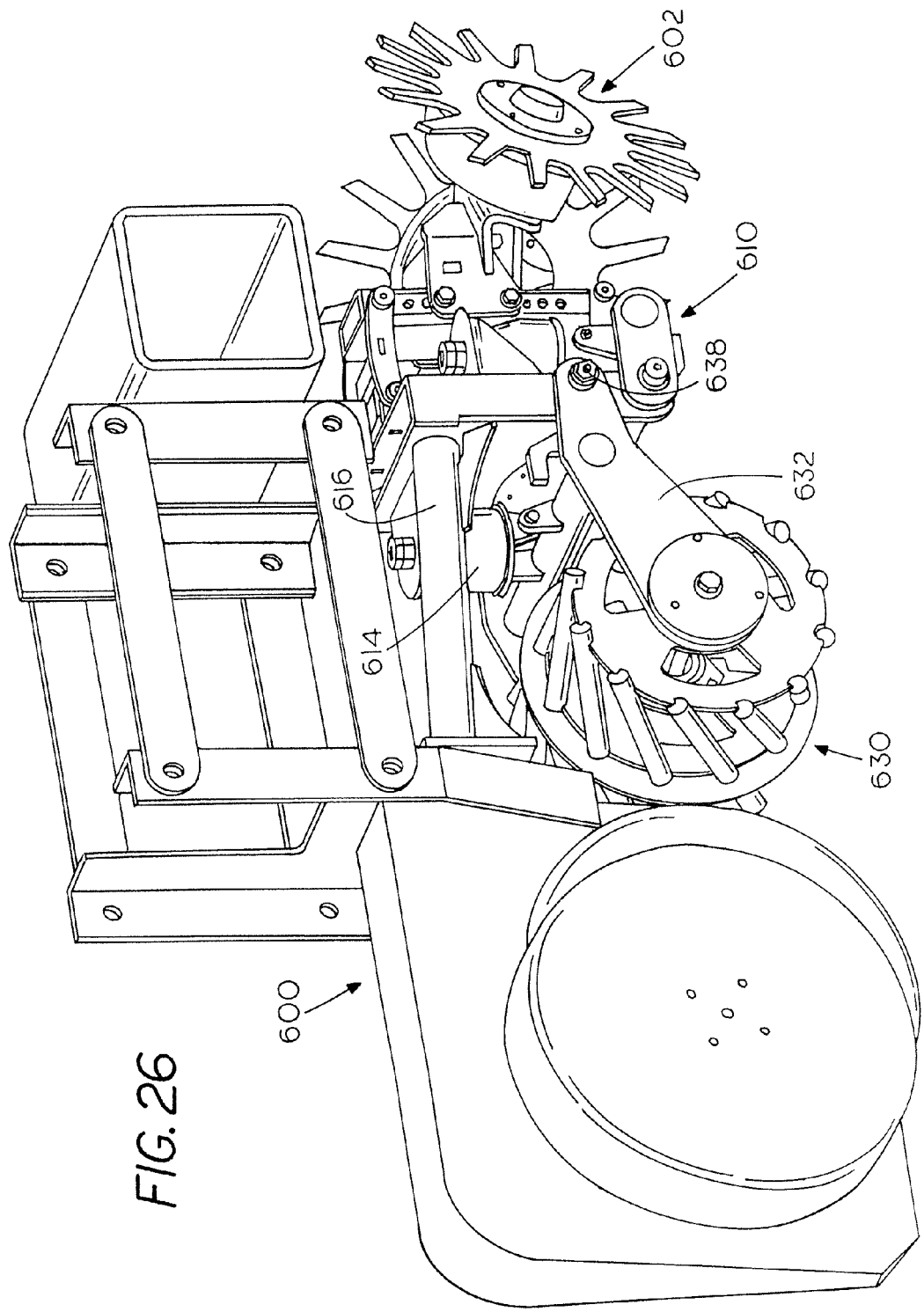
FIG. 26 is a rear perspective view of a combination of a forward-mounted trash whipping device and a coulter disk mounted between sections of a split rolling basket implement using a common mounting structure.

FIGS. 26 and 27A and 27B depict rear perspective and front and back elevational views of a planter as in FIG. 24 to which a trash whip is attached, together with an implement that combines a rolling basket with a coulter device. Both implements are mounted on the common mounting structure or assembly 610. The combination of rolling basket and coulter device 630 is carried by a pair of attachment members 632 which allow rotation of the coulter disk 606 and rolling basket sections 634 and 636 and also enable vertical displacement by pivoting about joints as at 638. They are carried by a common shaft 640. As with the coulter embodiment of FIGS. 24 and 25B, combination device 630 is operated by a single down force deployment airbag 614. Releasing the down force, of course, enables the device to simply roll along on top of the soil. This combination enables the planting operation to accomplish the actions of all three agricultural implements in a single pass.

Figure 28:
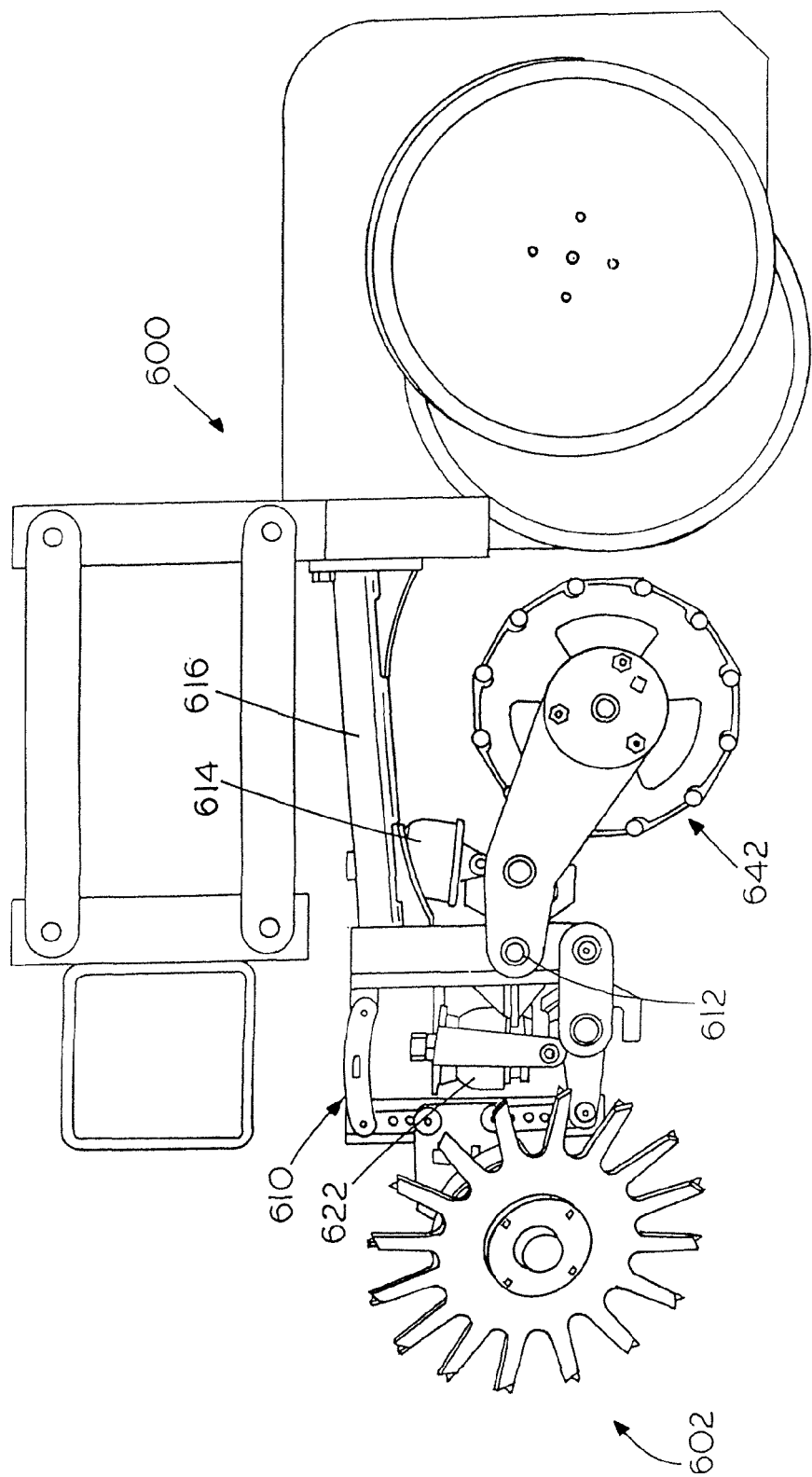
FIG. 28 is a side elevational view depicting a combination of a trash whipping implement with a rolling rowbasket mounted on a common assembly with the rowbasket having a down force only airbag deployment system and the trash whipping device having dual-acting airbags.

FIGS. 28 and 29A and 29B depict a side elevation view showing a combination of a trash whipping implement 602 with a rolling basket 642 mounted to the common assembly 610 with the rolling basket having a down force only airbag deployment system 614 and the trash whipping device having dual-acting up/down airbags. As with the other down force only devices, when the down force is released from the airbag 614, the rolling basket 642 will simply float or roll along the surface of the ground in a harmless manner.

Figure 30:
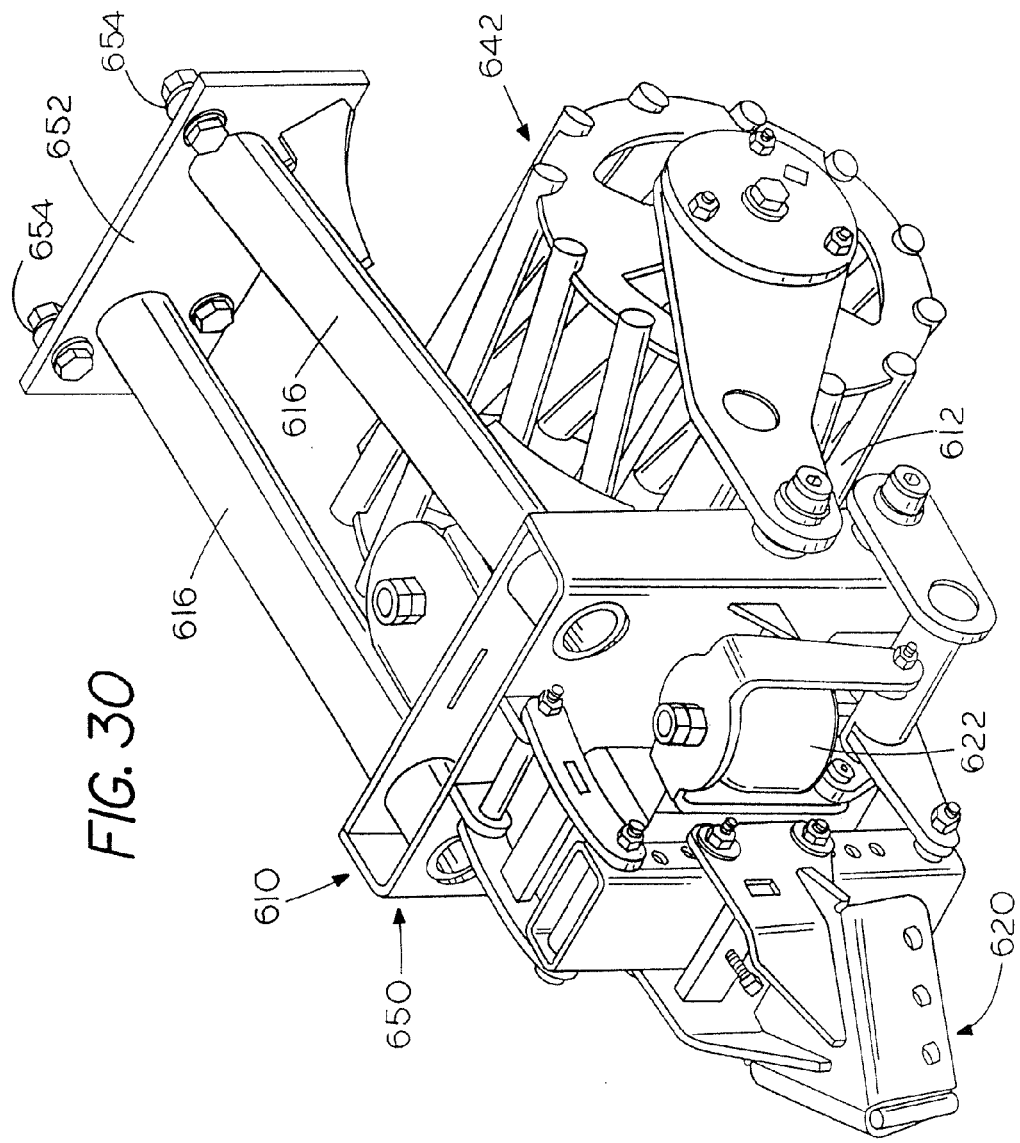
FIG. 30 is a front perspective view showing a common mount for a trash whip and rolling basket combination with rolling basket using a down force only airbag.

FIG. 30 is a front perspective view showing a common mounting structure for the trash whip and rolling basket in which the rolling basket is deployed with a down force only airbag. The common mounting structure 610 includes a box shape 650 which receives the front end of two connecting members 616, the other end of which connects to a mounting plate 652 which, in turn, connects to the main planter device 600 using threaded connectors as at 654. Note that both the trash whip mount 620 and rolling basket 640 are connected through devices from the simple box structure 650. The structure 610 enables implements to be mounted both ahead of and behind the box configuration 650.

Figure 31:
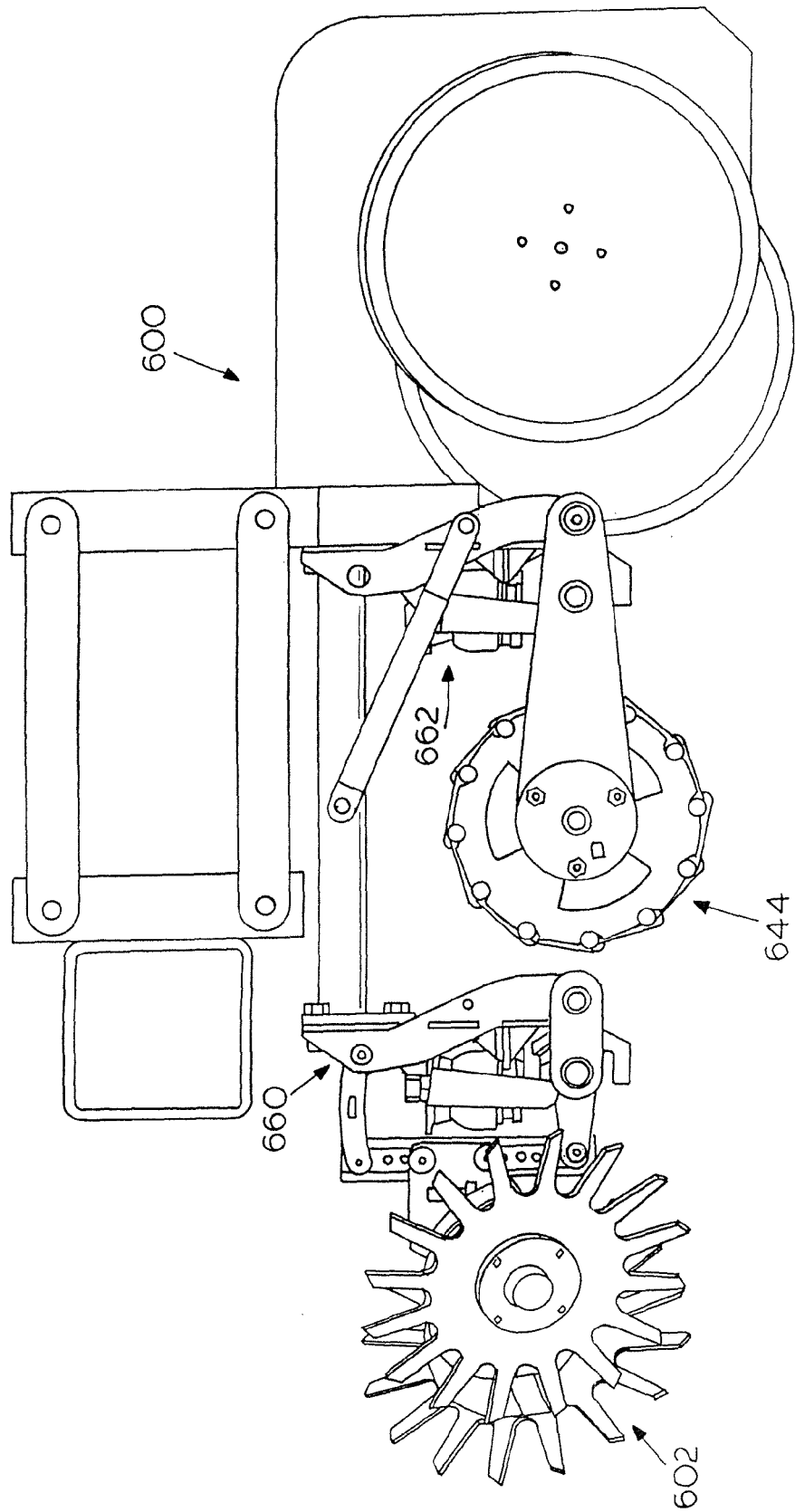
FIG. 31 is a side elevational view depicting a trash whipping device mounted in front of a rolling basket using two different spaced mounting assemblies.

FIG. 31 depicts a side elevational view in which a trash whipping device 602 and a rolling basket 640 are attached to a planter implement using two different spaced attachment assemblies 660 and 662, respectively.

Figure 32:
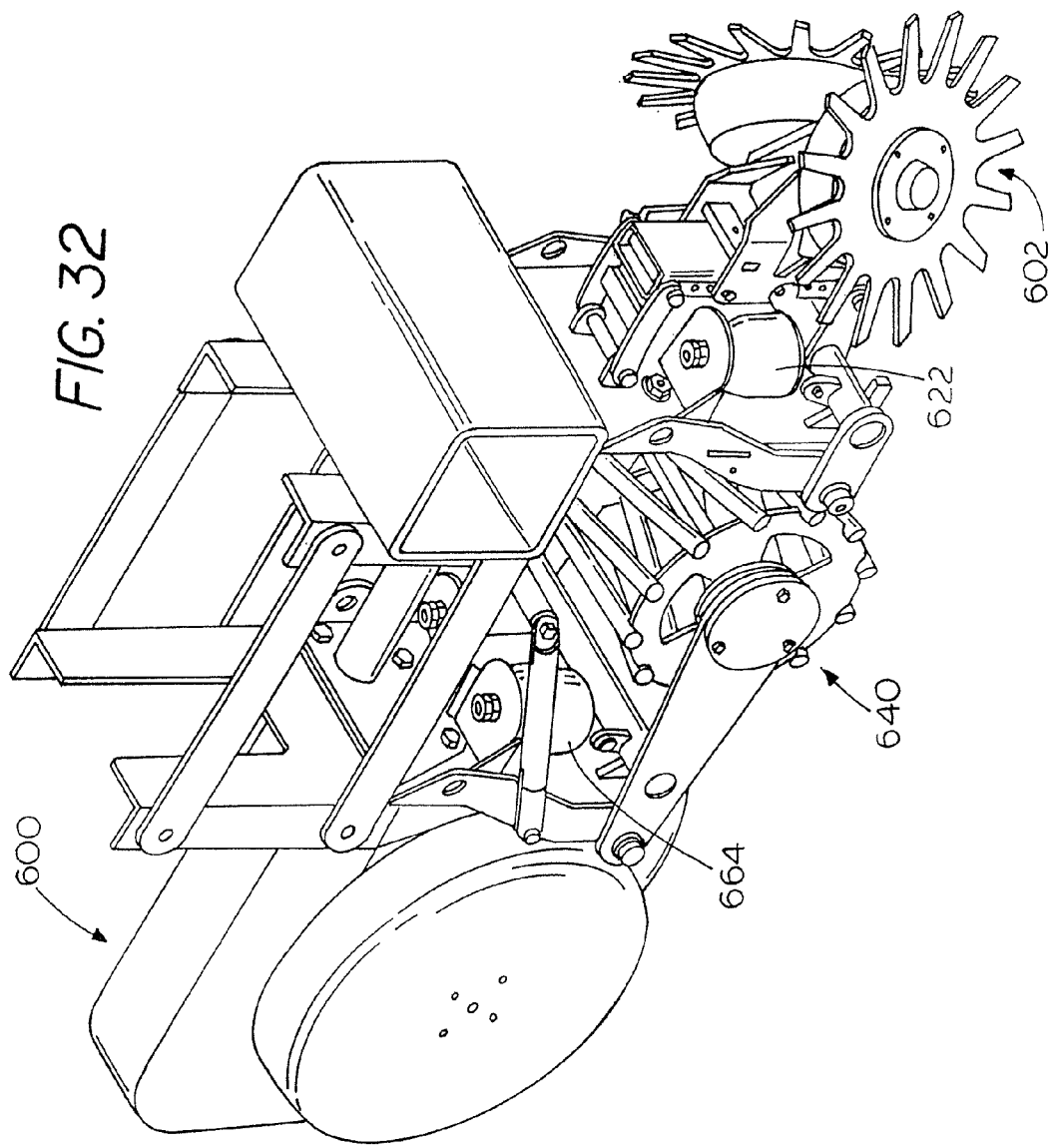
FIG. 32 is a front perspective view of the embodiment of FIG. 31.
Figure 33:
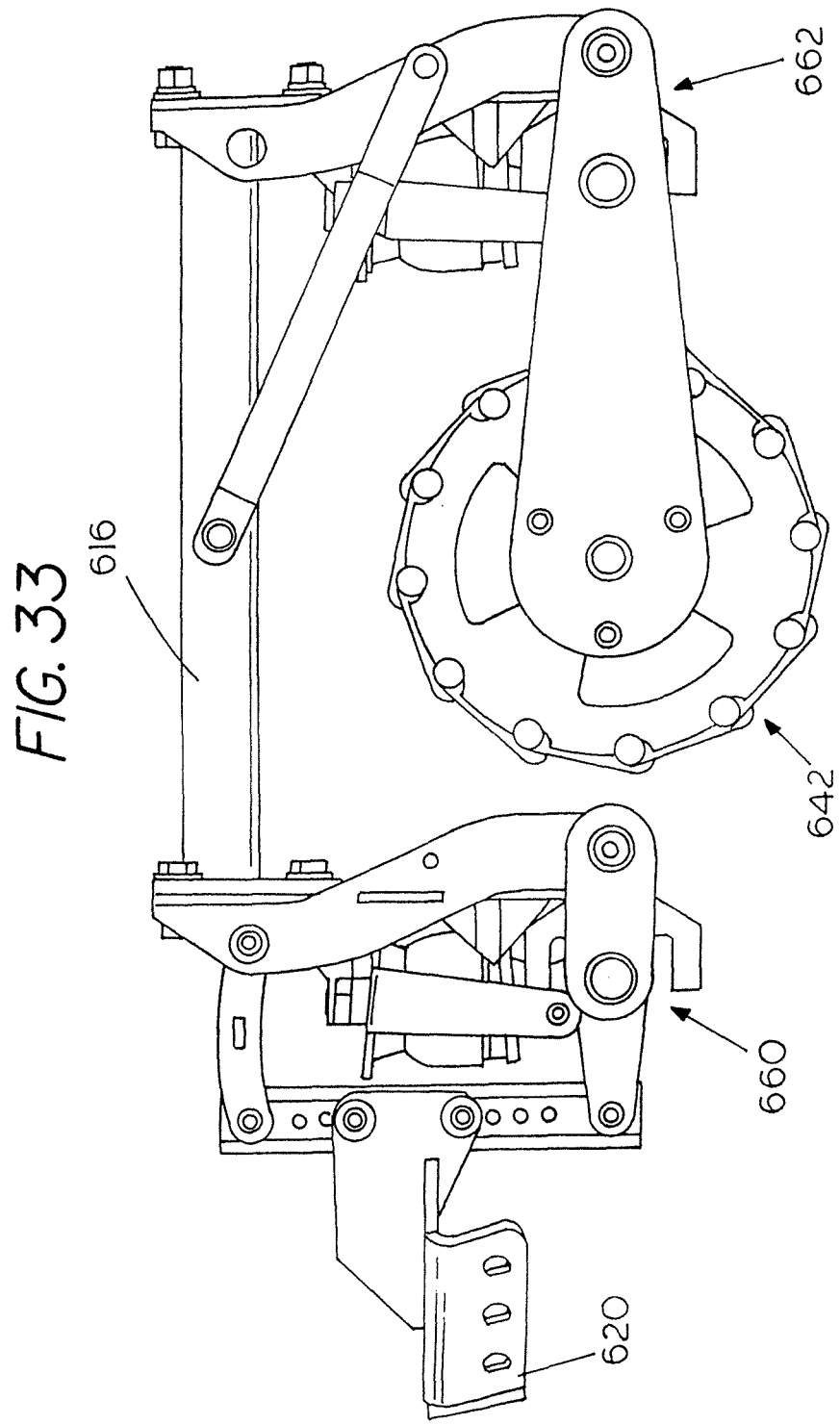
FIG. 33 is a side elevational view of the mounting system of the embodiment of FIG. 31.
Figure 34:
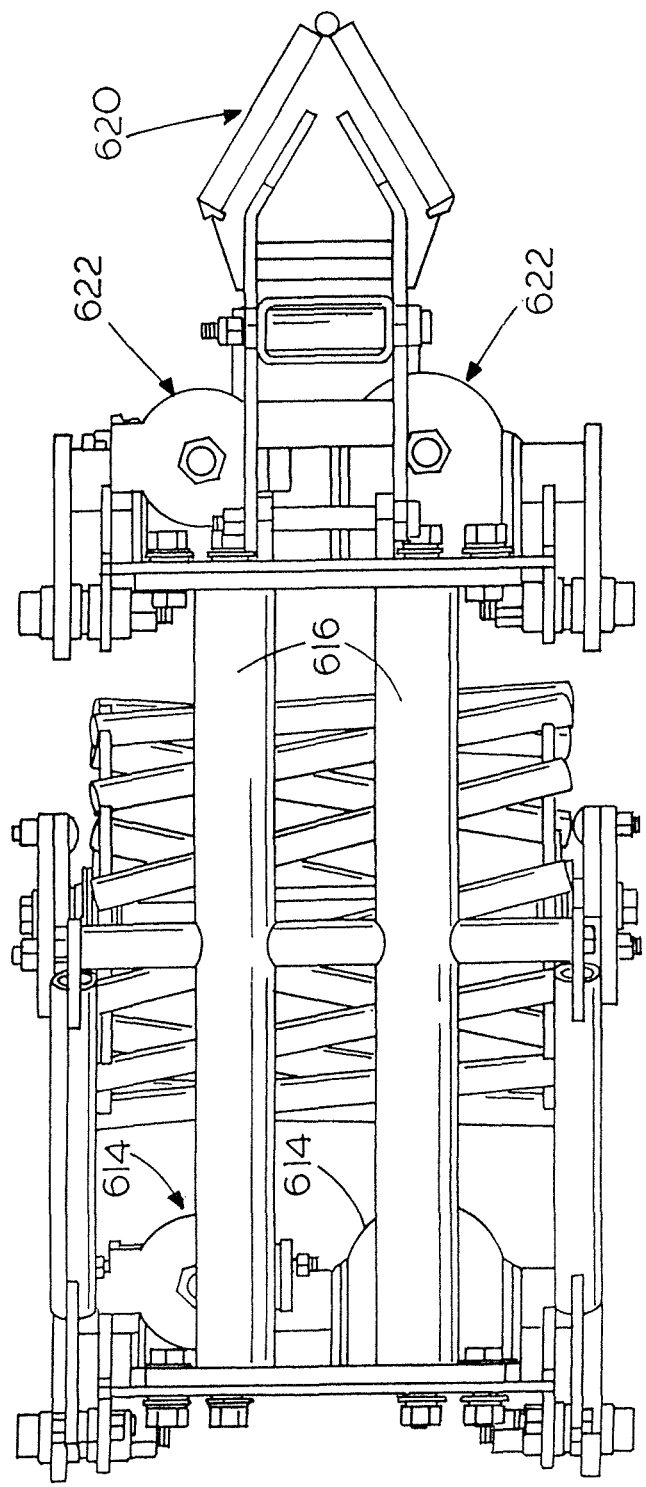
FIG. 34 is a top view of the mounting system of FIG. 33.

FIG. 32 depicts a front perspective view of the assembly of FIG. 31. In this embodiment, the rowbasket 640 is deployed and retracted using a dual airbag system with airbag 664 shown in the perspective view. A slightly enlarged side elevational view of the assembly of FIGS. 31 and 32 is depicted in FIG. 33. The mounting system 666 shown for the trash whip device is quite similar to embodiments described earlier with regard to the use of the trash whip as a single device, as illustrated in FIGS. 20A-21C. Likewise, the mounting assembly 668 for the rolling basket 640 can be similar to that shown in FIGS. 14A-16. Such a mounting system, as shown in FIGS. 31-33, is particularly useful when combinations of soil-treating devices are added in tandem to existing planter combinations. A top view of the system of FIGS. 31-33 is shown in FIG. 34 and, in that figure, both the rolling basket and trash whip devices are operated using a dual set of airbags so that both down force and up force are available in deploying and retracting the devices.

A further embodiment is shown in FIGS. 35A-D in which a height-adjustable trash whipper mounting assembly is mounted in combination with a rolling basket device. The embodiment is shown generally at 700 and includes a mounting arrangement for a trash whipping device at 702, a mounting system for a rolling basket at 704 and a system for attachment to a planter or transversely extending tool bar attached behind a tractor at 705.

The trash whipping mounting frame assembly includes a vertically adjustable parallel bar linkage system having pairs of upper and lower parallel linkage members 706 and 708 spanned by pairs of generally transverse U-shaped member 710 and a pair of generally vertical side members 712. Only one of each of the paired member is shown in a particular view, but the mounting assembly has two symmetrical, generally identical opposed sides. The members 710 carry triangular trash whipper mount 714. The members 706 and 708 are mounted to pivot as at 716 and 718.

The trash whipper mounting assembly is controlled to operate generally vertically by two opposed pneumatic actuators or operators which may be a lift force air bag 720 and a down force air bag 722 that are mounted in aligned fashion to push in opposite directions against a centrally located plate member 724 which in turn is connected to members 712 to pivot the linkage structure up and down to retract and deploy a device or tool attached to the triangular mount 714.

Figure 35A:
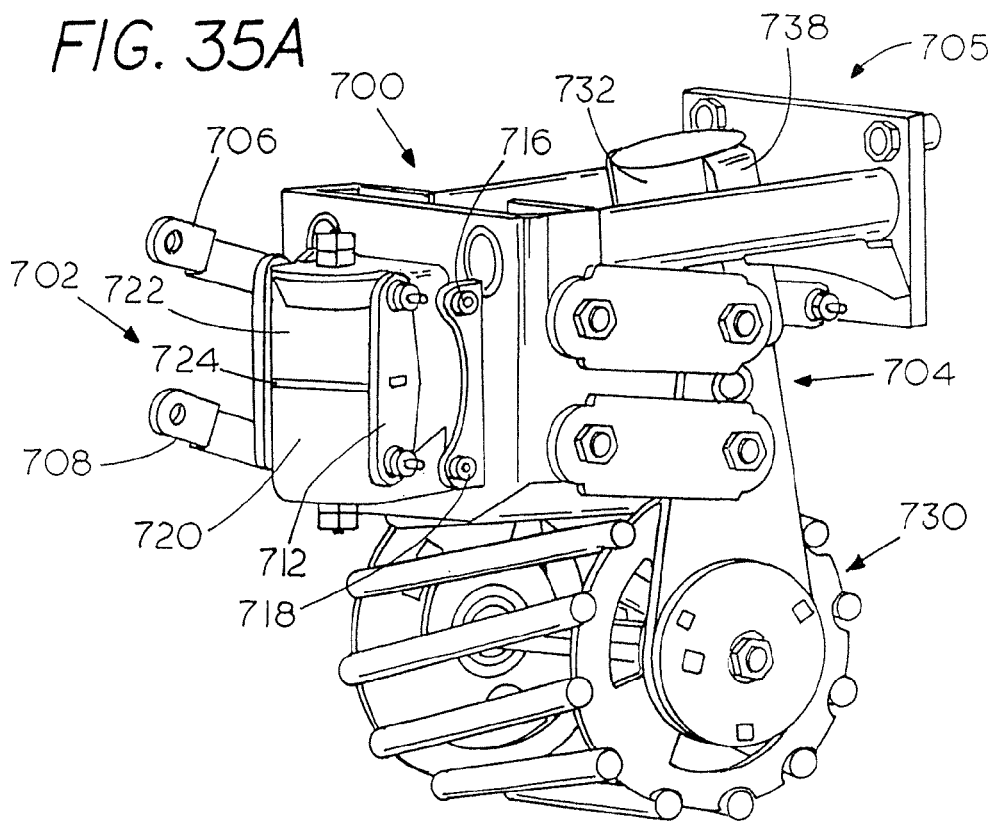
FIGS. 35A and 35B are perspective views of another embodiment of the invention in which a trash whipping attachment is combined with a rolling basket soil conditioning implement showing a mounting and deployment system for the trash whipping device shown in a raised and lowered position.
Figure 35B:
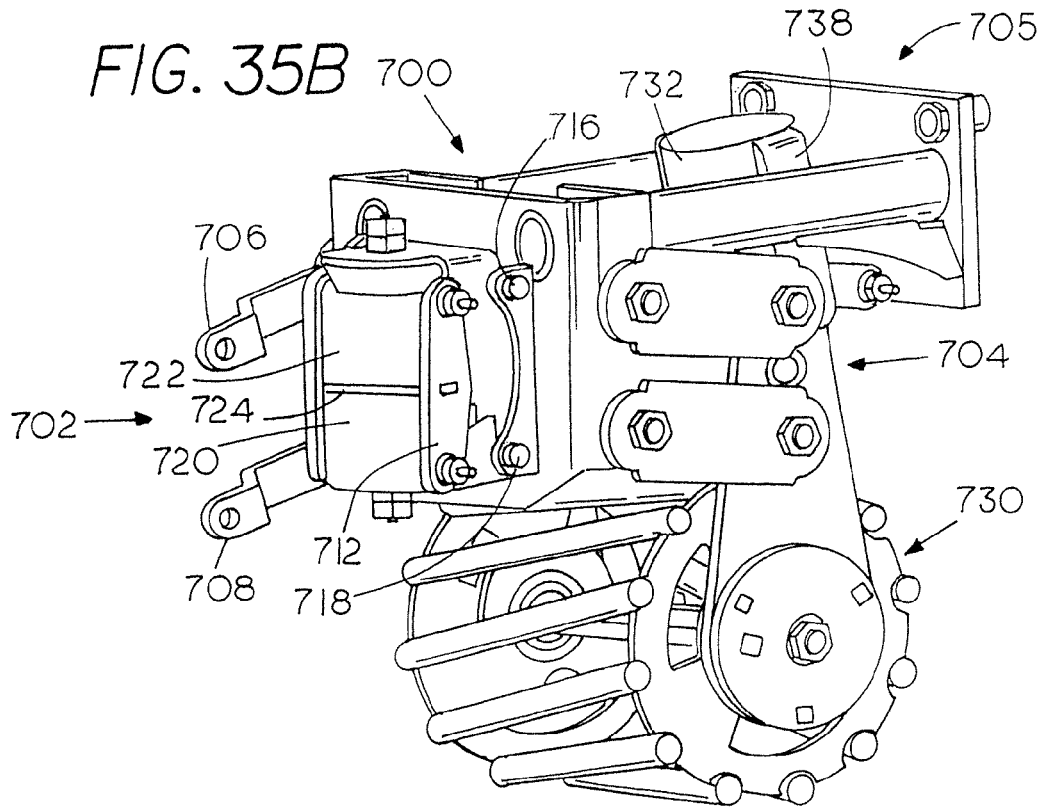

Movement of and force exerted on the linkage is determined by the relative inflation of the aligned air bags and this can be used to position the associated implement or tool and modulate the force exerted by the tool on the soil. Generally when the tool is to be stowed in the fully raised position the down force operator can be vented and collapsed. FIG. 35A depicts the linkage members 706 and 708 in the up position, the central plate member 704 having been displaced upward with the lift operator 720 being under more pressure than the down force operator 722. Conversely, in FIG. 35B the pressure in the down force operator 722 exceeds that in the up force operator thereby displacing the member 714 downward. It will be appreciated that the relative net force exerted on a mounted tool can be controlled quite accurately.

Figure 35C:
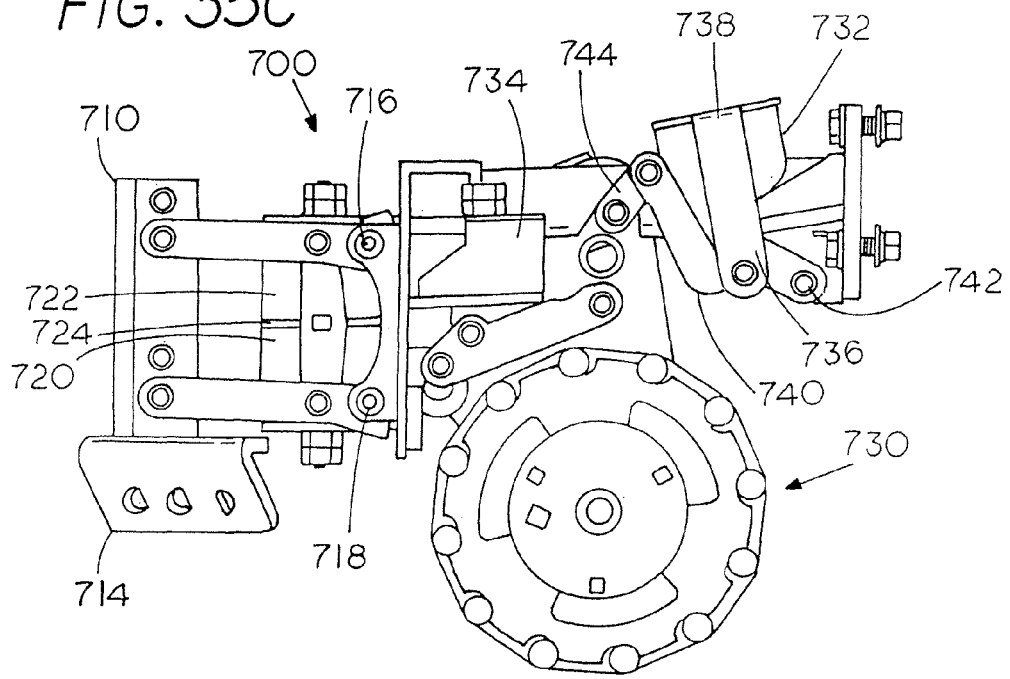
FIGS. 35C and 35D are side view of the embodiment of FIGS. 35A and 35B with parts removed to better view the rolling basket mounting and deployment and mounting linkage aspects, which are shown in a raised and lowered position, respectively.
Figure 35D:
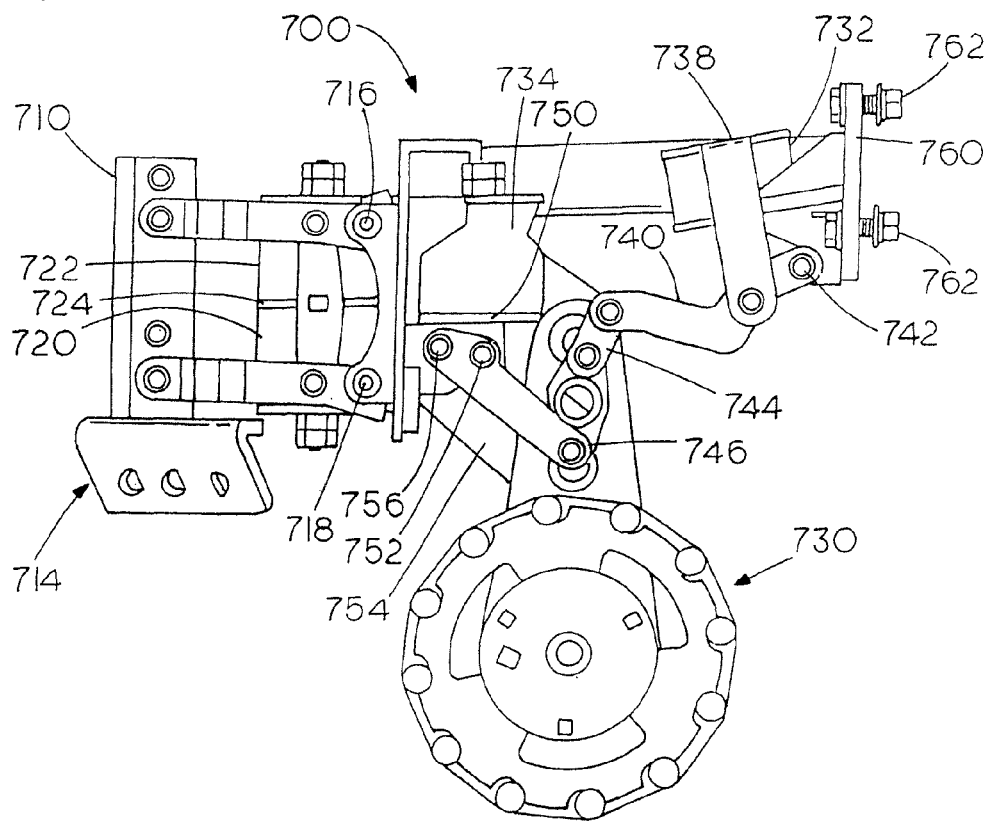
Figure 36A:
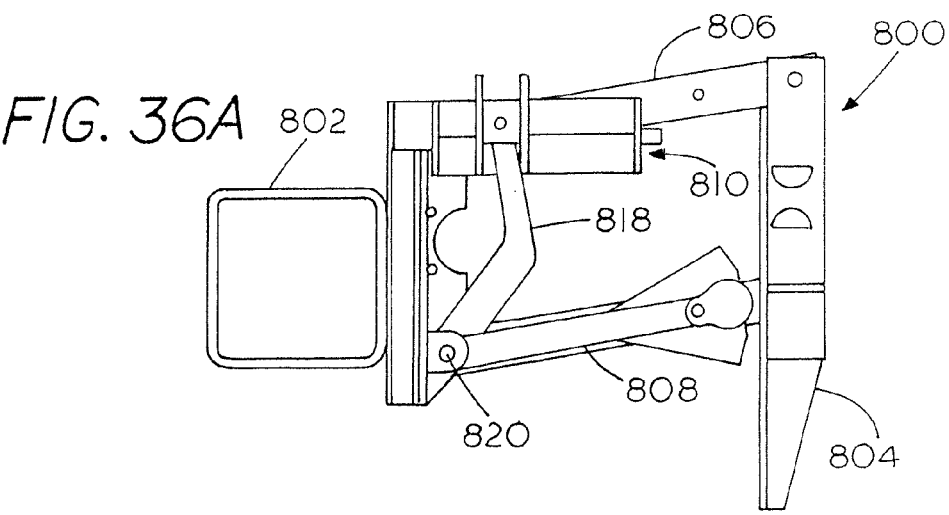
FIGS. 36A-36D are side sectional and top views of a planter row seeding unit mounting and adjustable deployment assembly arrangement shown in a raised and lowered position.
Figure 36B:
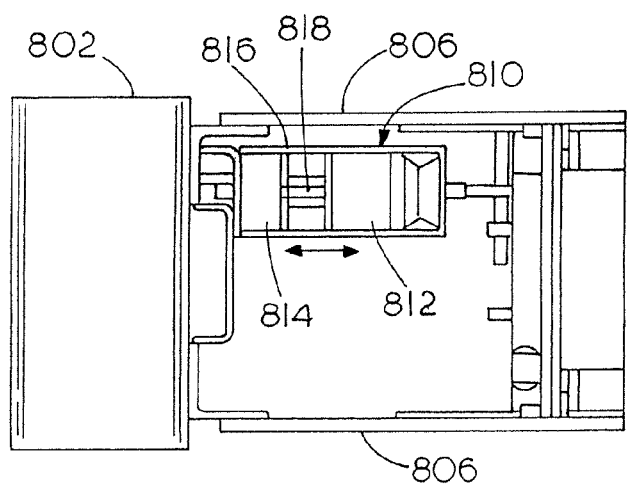
Figure 36C:
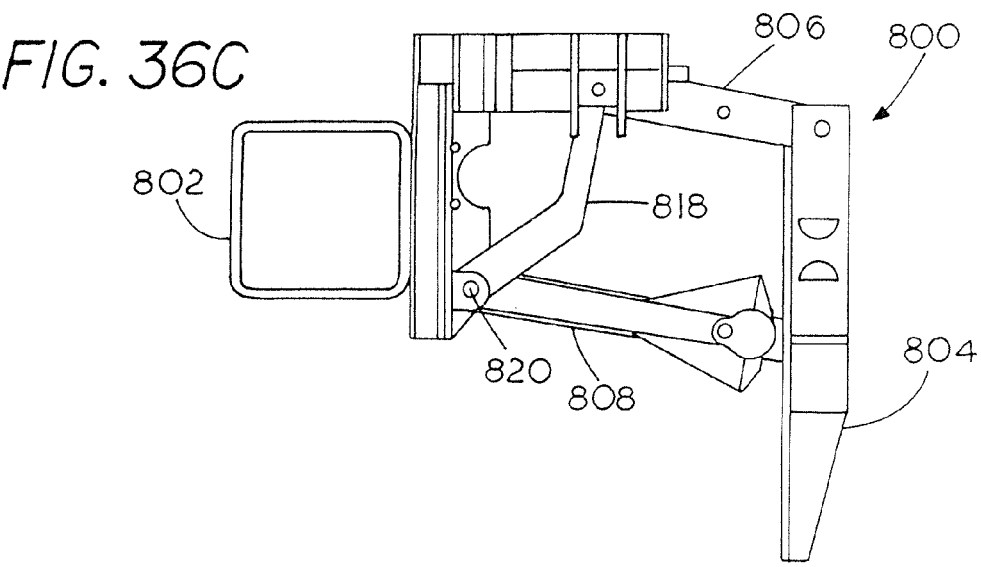
Figure 36D:
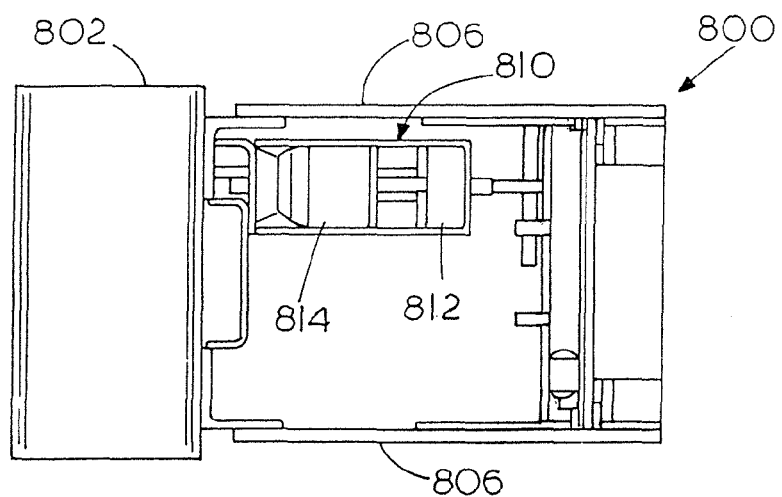
Figure 36E:
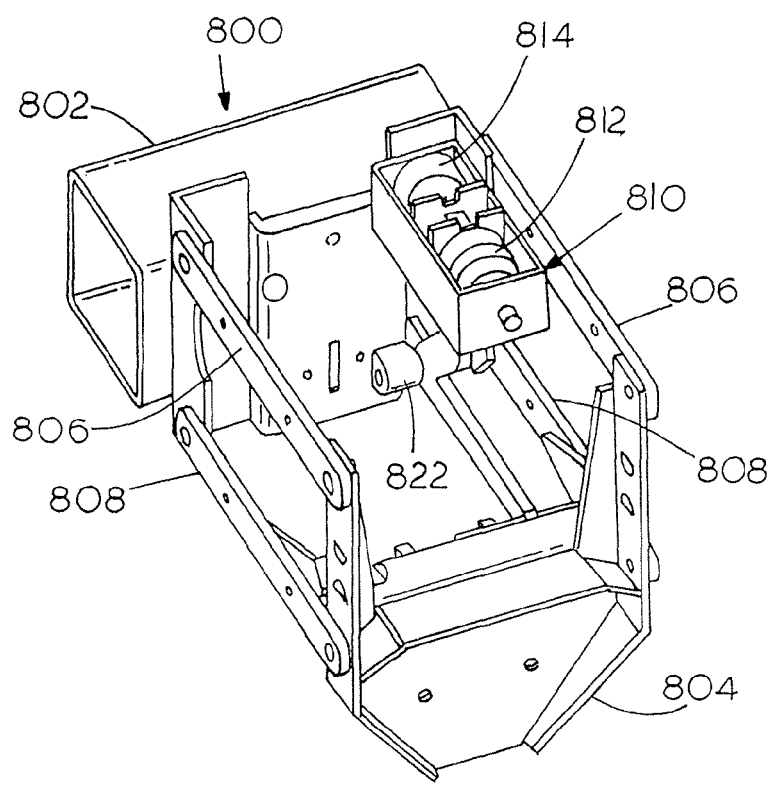
FIG. 36E depicts a front perspective view of the embodiment of FIGS. 36A-36D.
Figure 37B:
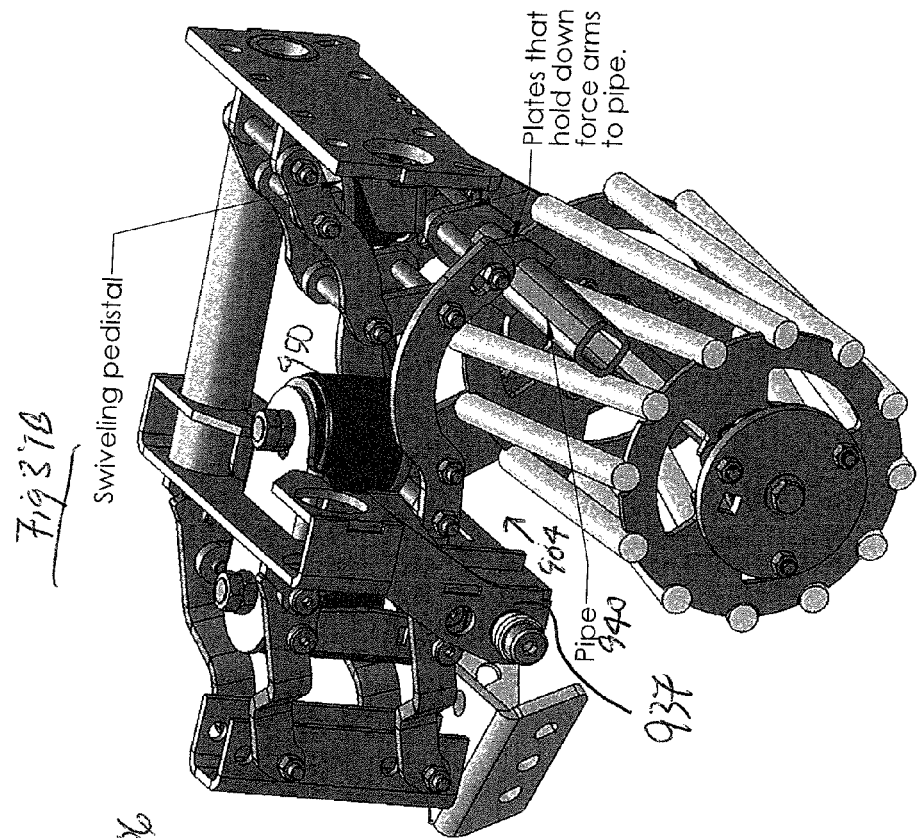
FIGS. 37A and 37B show a side elevational view and a rear perspective view of an alternate embodiment of a mounting and deployment system for a combination of field treating tools including trash clearing, trash whipping device mounted in combination with a rolling basket soil conditioning device in which parts have been removed for clarity and in which both devices are shown in the lowered or deployed position.
Figure 37A:
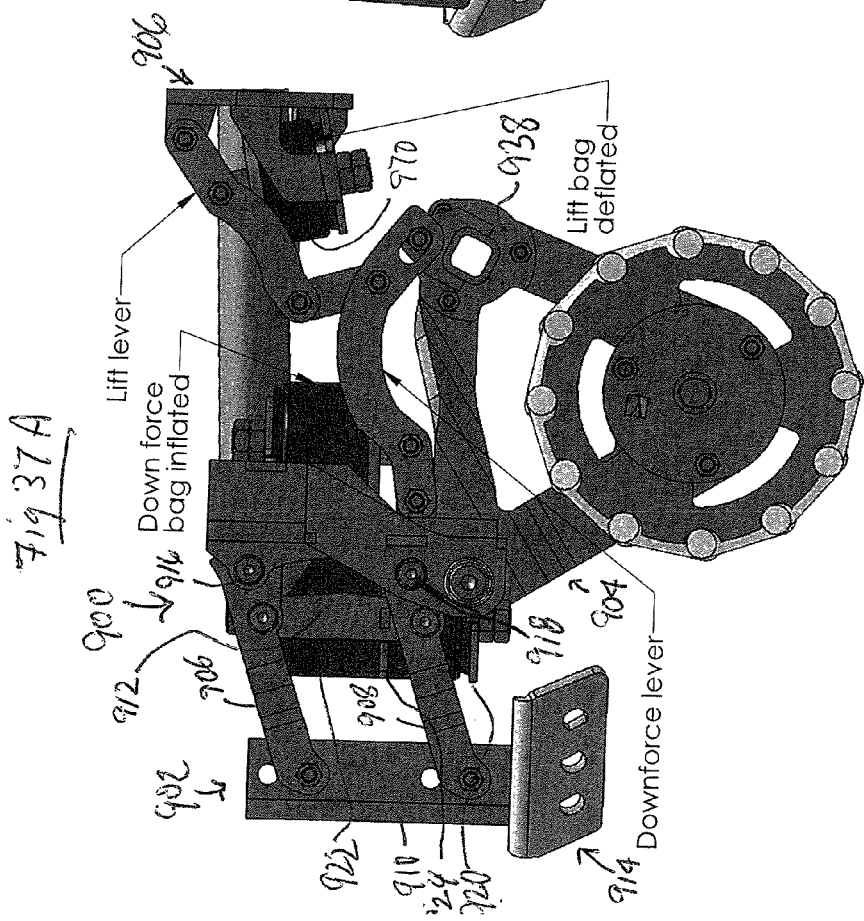
Figure 40:
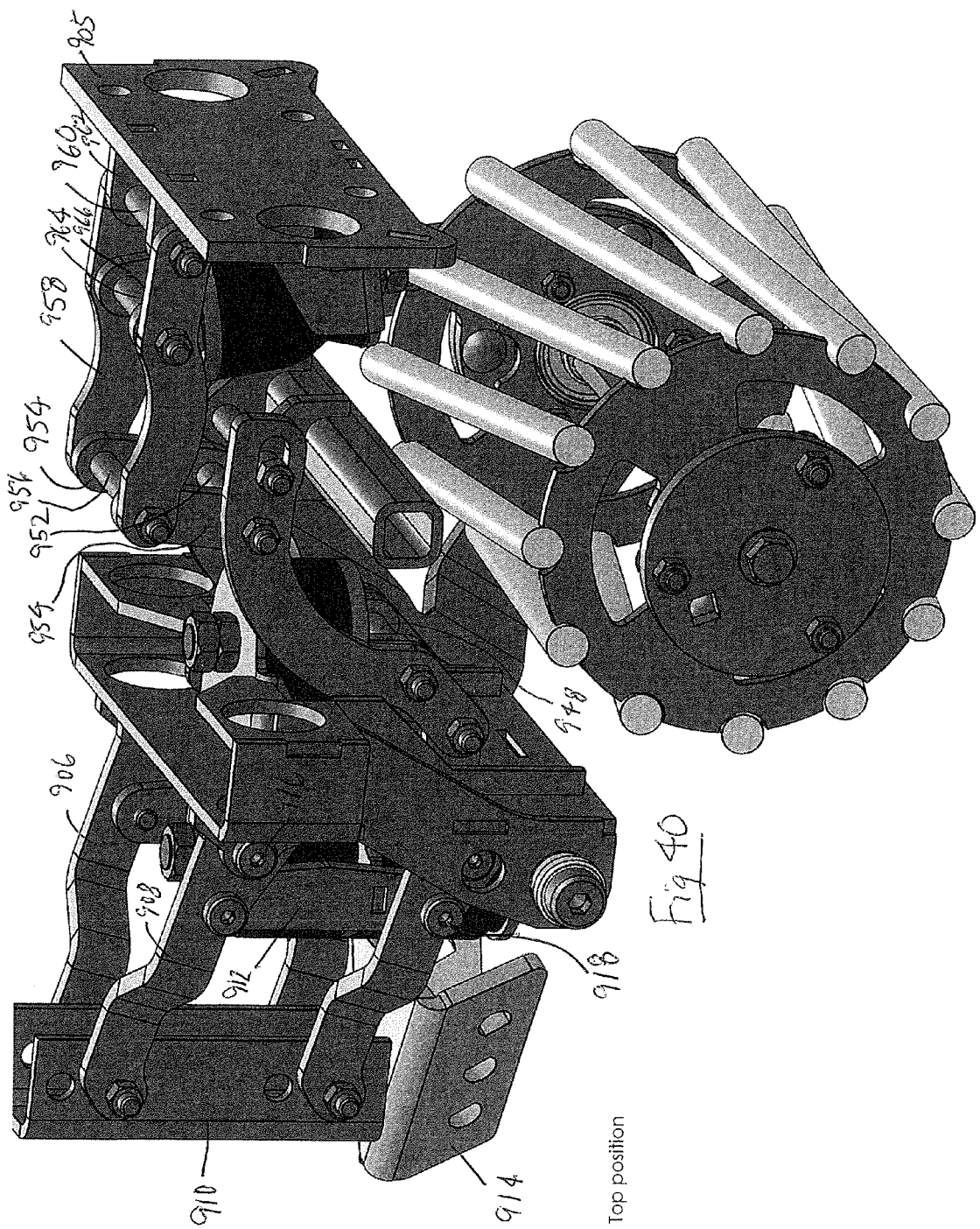
FIG. 40 is a view similar to FIG. 38B greatly enlarged.

The rolling basket mounting system is best shown in the side elevational views of FIGS. 35C and 35D in which parts have been removed to better view the basket mounting and operating system and which show the basket 730 in a raised and lowered position, respectively. The mounting system a lift force operator 732 and a down force operator 734. These may also preferentially be air bags or the like. The lift force operator pushes against a pair of spaced linkage members one of which is shown at 736 which are spanned by a flange member 738. Each member 736 is pivotably connected to a shaped lift lever 740 which has a fixed fulcrum 742. The free end of lift levers 740 connect to a further link 744 which adds flexibility to the linkage. The lift lever 740 pivots in circular motion about fulcrum 742. Other linkage member 746 connects link 744 and the lift system with a down force system. The FIG. 35C shows the system with the basked in the raised position and the lift levers 740 in the raised position with lift air bag 732 inflated and down force operator 734 deflated.

The down force operator 734 operates against a plate member 750 which is connected to spaced down force levers 752 at 754 to pivot levers 752 about a down force lever fulcrum 756. Members 754 have a free end connected to one end of linkage members 746 and also operate with a circular motion about fulcrum 756 with the moving end operating to transfer downward motion to the rolling basket and using members 746 and pulls down on lift levers 740 when the down force operator 734 is inflated. This collapses or reduces lift operator 732 as shown in the FIG. 35D.

The embodiment is designed to attach to a planer or toolbar as by using a plate 760 with fasteners 762. As shown the two implements can be operated totally independently with the deployment and ground pressure independently controlled.

A further embodiment is shown in FIGS. 36A-36E in which aligned directly opposed pneumatic operators or air bags are employed to control the vertical force exerted on individual planter row seeding units of a multi-row planter. Control of this force enables each individual seeding unit to place its seeds at the correct depth regardless of the contour of the ground in a given field which, as is well known may vary considerably. The system also provides better control over the operation of individual seeding units. A unit is shown in an "up" position in FIGS. 36A and 36B, and in a "down" position in FIGS. 36C and 36D. A front perspective is show in FIG. 36E.

The seeding unit, generally at 800, is attached to a member 802 of a multi-row planter (not shown). The seeding head 804 is attached to move up and down by a linkage having pairs of spaced parallel pivoting linkage members including upper members 806 and lower members 808.

The pneumatic operators are housed within a steel cage 810 and include a lift air bag 812 and a down force air bag 814. A plate assembly 816 attached to the end of a pivoting lever 818 is sandwiched between the air bags 812 and 814. The pivoting lever 818 is attached at 820 to a member 822 to pivot member 808 as the upper end of the member 818 moves back and forth with the inflation and deflation of the axially aligned opposed pneumatic operators. This pivots the parallel linkage correspondingly as shown in the Figures.

A further alternate embodiment of the combination of FIGS. 35A-35D is shown in FIGS. 37A, 37B, 38A and 38B, 39A and 39B, 40 and 41 in which a height-adjustable trash clearing device is mounted in combination with a height-adjustable rolling basket device on a heavy frame assembly. The embodiment is shown generally at 900 and includes a mounting arrangement for a row clearing or trash whipping device at 902, a mounting system for a rolling basket at 904 and a mounting plate for attachment to a planter or transversely extending tool bar attached behind a tractor at 905.

The row clearance or trash whipping aspect has a mounting frame assembly that includes a vertically adjustable parallel bar linkage system having pairs of upper and lower parallel linkage members 906 and 908 spanned at free ends, by a generally vertical transverse U-shaped member 910 and a pair of generally vertical side members 912. Only one of each of the paired members is shown in some views, but the mounting assembly has two symmetrical, generally identical opposed sides. The member 910 also carries a triangular mount 914 designed to carry residue or trash removing disks. The members 906 and 908 are mounted to pivot as at 916 and 918, respectively.

As was the case in the embodiment of FIGS. 35A-35D, the trash mounting or residue removing assembly is controlled to operate generally vertically by two aligned, opposed pneumatic actuators or operators which may be a lift force air bag 920 and a down force air bag 922 that are mounted in aligned fashion to push in opposite, generally vertical, directions against a centrally located plate member 924 which, in turn, is connected to members 912. The vertical displacement of plate member 924 raises and lowers members 912 which pivot the linkage structure up and down to retract and deploy wheels or disks attached to the triangular mount 914.

Movement of and force exerted on the linkage is determined by the relative inflation of the aligned air bags and this can be used to position the associated wheels or disks and modulate the force exerted by the tool on the soil. Generally when the tool is to be stowed in the fully raised position the down force operator can be vented and partially collapsed. Stops to limit the pivotal travel of the linkage members 906 and 908 and thus, the travel of members 924, are provided in the fixed ends of those members. FIGS. 38A and 38B depict the linkage members 906 and 908 in the "up" position, the central plate member 924 having been displaced upward with the lift operator 920 being supplied with more pressure than the down force operator 922. Conversely, in FIGS. 37A and 37B, the pressure in the down force operator 922 exceeds that in the up force operator thereby displacing the member 914 downward. It will be appreciated that the relative net force exerted on a mounted tool can be controlled quite accurately by varying the pressure in both aligned operators.

The rolling basket mounting and deployment system as shown in FIGS. 37A, 37B, 38A, 38B and 39A and 39B, 40 and 41 is significantly different.

The rolling basket 930 is provided to rotate about a shaft 932 in a well known manner. The rolling basket is carried by spaced triangular basket support arm assemblies 934 that have one vertex carried by the shaft 932, a second vertex mounted to pivot about a fulcrum at 936 as carried by a bushing journaled in a member 937 carried by the assembly frame, a third vertex that is bolted to a connecting member 938 that, in turn, is welded to a square tubular transverse support member 940. The basket support arm assemblies are located at each end of the basket 930.

A pair of spaced main shaped pivot lever arm members 942 are each connected between a pivotal mount 944 and square tubular transverse support member 940 where they are adjustably connected via a shaped member as at 946 fixed to the upper part of tubular transverse support member 940. The shaped pivot lever arm members 942 are connected to a down force transmitting common shaft member 948 (FIG. 40) which is also connected to the lower pad of a down force air operator 950, and members 942 are also connected to a lift force common shaft member 952 which carries the lower end of spaced lift force members 954. The upper end of lift force members 954 are carried on a shaft 956 which connects them with a lift force lever system that includes spaced lever members 958 journaled toward one end in shaft member 956 and toward the other end in pivot shaft 960 which is journaled in spaced lug members 962 which, in turn, are fixed to main mounting plate 905. An intermediate shaft 964 is mounted between and spanning lever members 958 and is connected through lugs 966 which are fixed to the upper pad 968 of a lift force air operator 970, the lower end of which rests on a shaped mounting member 972 also fixed to main mounting plate 905.

In this manner, the net up or down force determined by the relative inflation of pneumatic operators 950 and 970 acts directly through leveraged connections on pivotally mounted shaped pivot lever arm members 942 which, in turn, control the generally vertical adjustment of tubular member 940 which moves through an arcuate path to raise and lower and provide any desired down force on the rolling basket 930 which, in turn, pivots on triangular basket support arm assemblies 934. Of course, the relative position of shaft 964 between shafts 956 and 960 adjust the leverage and determines the relative lift force exerted to pivot members 942 and raise tube 940 and likewise, the relative distance between shafts 944 and 948 adjusts the leverage exerted by down force pneumatic operator 950 to pivot members 942 and lower or add ground force to tube 940.

It will be appreciated that the embodiment of FIG. 37A-41 simplifies the linkages and provides a deployment system for a rolling basket in which both the lift-force mechanism and the down-force mechanism operates the same two pivot lever arm members 942 attached to a common tube.

While the embodiments illustrated show the combination of certain implements, it is contemplated that other combinations can be used.

It should be noted that any of the implements shown deployed with down force only airbags could also be operated using a dual set of down force and up force airbags and, if desired, other devices can be used to deploy and retract any of the agriculture implements shown. The details of the connections and operation of the airbag deployment and retraction systems is similar to those described in earlier embodiments and need not be described in great detail here. As with other embodiments, the down force can be modulated as desired.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A mounting and deployment system for a combination of field conditioning implements comprising:
    (a) a mounting structure adapted to carry and selectively and controllably deploy one or more field-conditioning implements;
    (b) a pneumatic actuating arrangement for selectively applying a deploying down force and retracting lift force to an implement for engaging and conditioning soil; and
    (c) wherein said pneumatic actuating arrangement further comprises a down force pneumatic operator and a lift force pneumatic operator both of which are connected to pivot a common pair of spaced pivot lever arms that operate in a generally vertical plane and are connected to a transverse support member that, in turn, connects a pair of spaced support arm assemblies adapted to be attached to ends of a rolling basket tillage implement, said support arm assemblies also being journaled at a pivot point to pivot from a mounting structure member such that the pivoting of the spaced pivot lever arms raises and lowers the transverse support member which causes the support arm assemblies to pivot thereby deploying and retracting an attached rolling basket.

2. A mounting and deployment system as in claim 1 wherein both down force and lift pneumatic operators can be pressurized at the same time to control the resulting force on a mounted implement.

3. A mounting and deployment system as in claim 2 wherein said pneumatic operators comprise air bags.

4. A mounting and deployment system as in claim 1 further comprising a pneumatically operated row clearance implement mounted on said system.

5. A mounting and deployment system as in claim 4 wherein said pneumatic operators comprise air bags.

6. A mounting and deployment system as in claim 1 wherein said pneumatic operators comprise air bags.

7. A mounting and deployment system as in claim 1 wherein said support arm assemblies are generally triangular with a first vertex adopted to be connected to said rolling basket, a second vertex attached at said pivot point and a third vertex fixed to said transverse support member.

8. A mounting and deployment system as in claim 1 wherein said down force pneumatic operator is mounted to act against a deployment shaft connected between said pair of spaced pivot lever arms.

9. A mounting and deployment system as in claim 1 wherein said lift force pneumatic operator is connected to a pivoting linkage connected to a lift shaft which is connected between said pair of spaced pivot lever arms.

10. A mounting and deployment system as in claim 1 wherein said transverse support member is a hollow rectangular tube and said spaced pivot lever arms are connected to an upper portion of said transverse support member.

* * * * *